United States Patent
Yoshinaga et al.

(10) Patent No.: US 10,914,981 B2
(45) Date of Patent: Feb. 9, 2021

(54) LIGHT EMITTING DEVICE

(71) Applicant: NICHIA CORPORATION, Anan (JP)

(72) Inventors: Satoshi Yoshinaga, Yoshinogawa (JP); Kana Mori, Anan (JP); Taketoshi Nakano, Anan (JP); Hajime Washio, Anan (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 16/583,834

(22) Filed: Sep. 26, 2019

(65) Prior Publication Data

US 2020/0103703 A1 Apr. 2, 2020

(30) Foreign Application Priority Data

Sep. 27, 2018 (JP) .................. 2018-181690

(51) Int. Cl.
  *G02F 1/13357* (2006.01)
(52) U.S. Cl.
  CPC ............... *G02F 1/133602* (2013.01); *G02F 2001/133613* (2013.01)
(58) Field of Classification Search
  CPC ... G02F 1/133602; G02F 2001/133613; G02F 1/1336; G02F 1/133514; G02F 1/133512; G02F 1/1368; G02F 1/133308
  USPC ........................... 362/97.1, 600–634
  See application file for complete search history.

(56) References Cited

U.S. PATENT DOCUMENTS

| | | |
|---|---|---|
| 2006/0245213 A1 | 11/2006 | Beil et al. |
| 2008/0094345 A1 | 4/2008 | Tseng et al. |
| 2012/0113353 A1 | 5/2012 | Kuromizu |
| 2012/0139445 A1 | 6/2012 | Fujiwara et al. |
| 2012/0212936 A1 | 8/2012 | Nozawa |
| 2015/0116389 A1 | 4/2015 | Watanabe |
| 2015/0138755 A1* | 5/2015 | Bastani ............ G09F 13/04 362/97.1 |

FOREIGN PATENT DOCUMENTS

| | | |
|---|---|---|
| JP | 2006522436 A | 9/2006 |
| JP | 2008103314 A | 5/2008 |
| WO | 2011004625 A1 | 1/2011 |
| WO | 2011024498 A1 | 3/2011 |
| WO | 2011067989 A1 | 6/2011 |
| WO | 2014014005 A1 | 1/2014 |

* cited by examiner

*Primary Examiner* — Cara E Rakowski
*Assistant Examiner* — Jessica M Apenteng
(74) *Attorney, Agent, or Firm* — Hunton Andrews Kurth LLP

(57) ABSTRACT

In accordance with an embodiment of the present invention, the light emitting device includes a first light emitting module and a plurality of second light emitting modules. The first light emitting module includes a first side along a first direction, and a second side along the first direction. The direction from the first side to the second side is along a second direction that intersects with the first direction. The plurality of second light emitting modules are lined up along the second direction. The direction from a first emission region which includes the plurality of second light emitting modules to the first light emitting module is along the first direction. The first emission region includes a third side along the first direction and a fourth side along the first direction. The direction from the third side to the first side is along the first direction. The direction from the fourth side to the second side is along the first direction.

12 Claims, 19 Drawing Sheets

LIGHT EMITTING DEVICE

This application claims priority to Japanese Patent Application No. 2018-181690, filed on Sep. 27, 2018, the entire contents of which are incorporated herein by reference.

BACKGROUND

The present invention relates to a light emitting device. Light emitting devices are utilized, for example, in backlights for use in display devices and the like. A light emitting device which combines multiple mounting substrates has been proposed. See, for example, International Unexamined Patent Application Publication No. 2011/004625. There is a need for a light emitting device having more functions.

SUMMARY

The present invention provides a light emitting device having more functions.

A light emitting device according to one aspect of the present invention includes a first light emitting module and a plurality of second light emitting modules. The first light emitting module includes a first side along a first direction and a second side along the first direction. The direction from the first side to the second side is along a second direction that intersects with the first direction. The plurality of second light emitting modules are lined up along the second direction. The direction from a first emission region which includes the plurality of second light emitting modules to the first light emitting module is along the first direction. The first emission region includes a third side along the first direction and a fourth side along the first direction. The direction from the third side to the first side is along the first direction. The direction from the fourth side to the second side is along the first direction.

A light emitting device according to another aspect of the present invention includes a first light emitting module and a group that includes a plurality of second light emitting modules lined up along a first direction. The first light emitting module is disposed at an edge of the group. The direction from the group to the first light emitting module is along the first direction. The shape of the first light emitting module differs from the shape of each of the plurality of second light emitting modules.

A light emitting device according to another aspect of the present invention includes a light emitting module which includes a plurality of light emitting elements, and a circuit part which is electrically connected to the plurality of light emitting elements. The circuit part switches between a first state where two or more of the plurality of light emitting elements are electrically connected in parallel and a second state where the two or more of the plurality of light emitting elements are electrically connected in series.

According to one aspect of the present invention, a light emitting device having more functions can be provided.

DESCRIPTION

Figure 1:
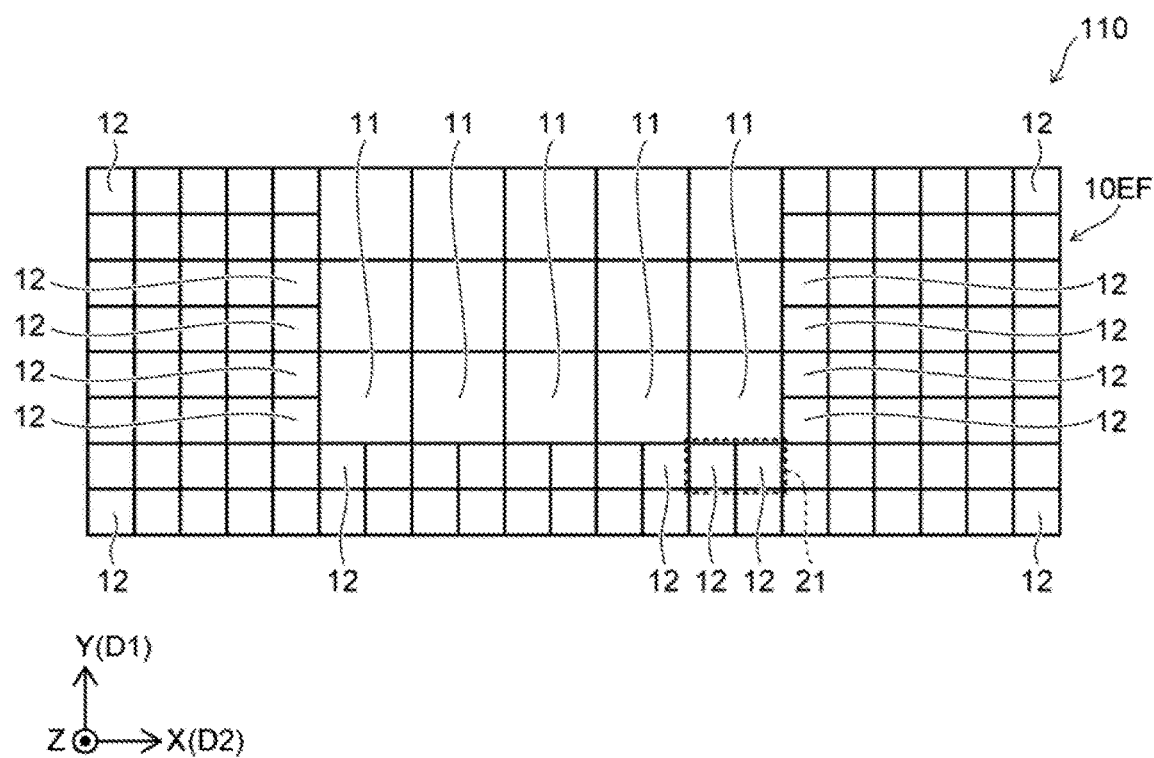
FIG. 1 is a schematic plan view illustrating by example a light emitting device according to a first embodiment of the present disclosure.

Certain embodiments of the present invention will be explained below with reference to the drawings.

The drawings are schematic or conceptual representations, and thus the relationship between the thickness and the width of each part, or the size ratio between parts, is not necessarily consistent with actuality. Moreover, even when the same part is shown, the dimensions or ratio might differ depending on the drawing.

In the description herein, elements similar to those described with reference to a previously explained drawing will be denoted with the same reference numerals for which the detailed explanation will be omitted as appropriate.

First Embodiment

FIG. 1 is a schematic plan view illustrating by example a light emitting device according to a first embodiment of the present disclosure.

As shown in FIG. 1, the light emitting device 110 of this embodiment includes a first light emitting module 11 and a plurality of second light emitting modules 12.

In one example, the light emitting modules described above are arranged in a plane (e.g., X-Y plane). The light emitting modules form an emission face 10EF of the light emitting device 110. In this embodiment, the emission face 10EF may be a curved face. In the following, an example of a flat emission face 10EF will be explained.

One direction of an X-Y plane is Y-axis direction. The direction perpendicular to the Y-axis direction is X-axis direction. The direction perpendicular to the X-Y plane is Z-axis direction.

In this example, a plurality of first light emitting modules 11 are provided. In this example, the plurality of first light emitting modules 11 are arranged along the X-axis direction and the Y-axis direction.

The individual size of the plurality of second light emitting modules 12 is smaller than the individual size of the first light emitting modules 11. Examples of sizes will be described later.

In this example, the first light emitting modules 11 are essentially quadrilaterals. Each second light emitting module 12 is essentially a quadrilateral. A quadrilateral includes a rectangle and a square. Examples of the shapes of the light emitting modules will be described later.

In the example shown in FIG. 1, the first light emitting modules 11 and the plurality of second light emitting modules 12 are quadrilaterals, and the shape of the emission face 10EF of the light emitting device 110 is substantially quadrilateral.

In this embodiment, the shapes of the first light emitting modules 11 and the plurality of second light emitting modules 12 may be parallelograms, trapezoids, or the like. In such a case, the shape of the emission face 10EF of the light emitting device 110 would essentially be a rectangle, parallelogram, or trapezoid.

As described later, the first light emitting modules 11 and the plurality of second light emitting modules 12 include light emitting elements. Light emitting elements emit light. Examples of light emitting elements will be described later.

The emitted light from the light emitting elements is output from the first light emitting modules 11 and the plurality of second light emitting modules 12. In this way, light is output from the emission face 10EF of the light emitting device 110.

Figure 2:
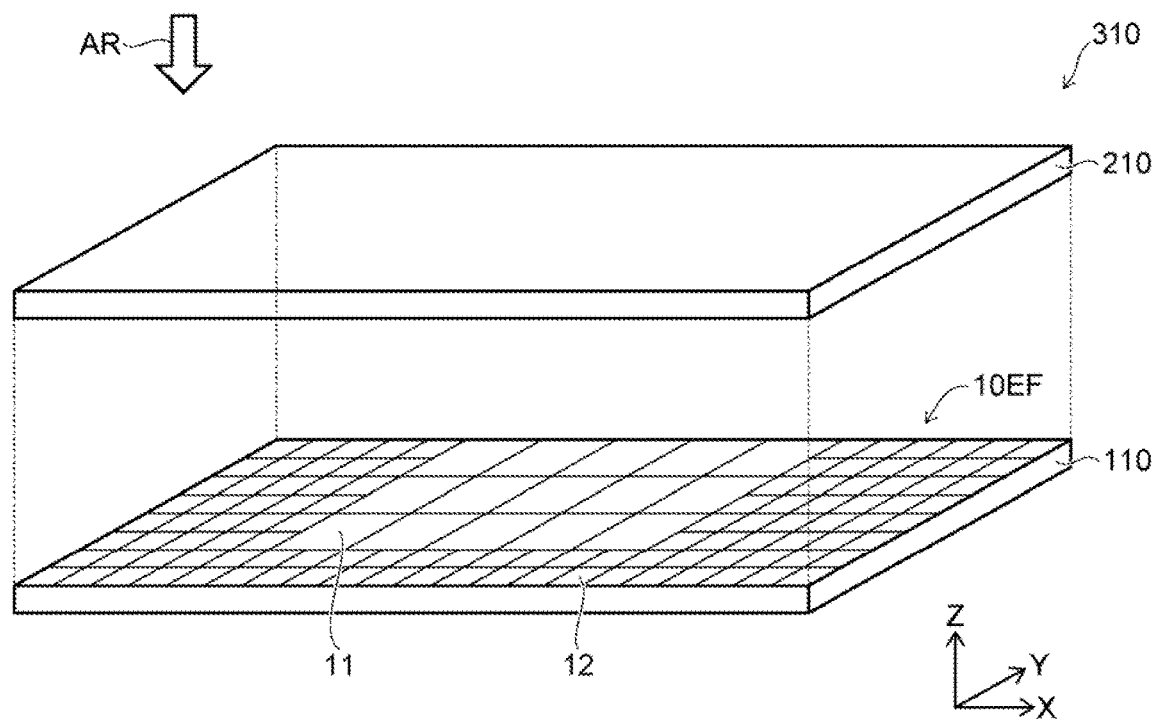
FIG. 2 is a schematic diagram of an application example of the light emitting device of the first embodiment.

FIG. 2 is a schematic diagram of an application example of the light emitting device of the first embodiment. As shown in FIG. 2, in a display device 310, a display panel 210 is laid over the light emitting device 110. The display panel 210, for example, is a liquid crystal panel. The display panel 210 has a switching function. The light output from the emission face 10EF of the light emitting device 110 enters the display panel 210. For example, the transmittance is controlled by the display panel 210 and a desired display pattern is achieved. An optical sheet (not shown) may be disposed between the display panel 210 and the light emitting device 110. The optical sheet, for example, includes at least one of a diffusion sheet, a prism sheet, and a lenticular sheet. The optical sheet may be included in the light emitting device 110. FIG. 1 is a plan view of the light emitting device 110 when viewed in the direction indicated by the arrow AR in FIG. 2.

In the display panel 210, when the transmittance is high, a bright state is achieved. When the transmittance is low, a dark state is achieved. A dark state corresponds to, for example, a "black" display. In a practical display panel 210, it is often the case that the transmittance is not zero even in a low transmittance state. For this reason, a "black" pattern occasionally appears "gray." This phenomenon is emphasized, for example, when the display panel 210 is viewed in a dark environment, such as in an automobile at night. This occasionally makes it difficult to achieve a desired display.

Even when the display panel 210 can display various patterns, there are cases where a specific pattern is displayed in one region of the display panel 210. In one example, a specific display pattern such as a "taskbar" is statically displayed near an outer edge of the display panel 210. In another example, a specific display pattern is displayed at a specific position when the device is starting up or standing by. In such a case, it is desirable for a "region where black is intended" to be displayed in a "desired black state" instead of "gray."

A conceivable method in response to such a need is that which divides the emission face 10EF of a light emitting device used as a backlight into multiple regions to independently control the emission states of the multiple regions. In this manner, the amount of light in a given location can be reduced in a localized manner to thereby achieve a "desired black state" in that location.

In the case of dividing the emission face 10EF of a light emitting device into multiple regions, a reference example is considered where a plurality of light emitting modules of one size (and shape) are employed. In this case, for example, the emission face 10EF is formed with N×M pieces of light emitting modules where N and M are integers that are 2 or higher. In this reference example, for example, wiring individually corresponding to the N×M pieces of light emitting modules is disposed, and the wiring is connected to a drive circuit. The reference example has a large number of wires, which increases the number of output parts that are included in the drive circuit. This increases the number of parts. This increases costs. This makes it difficult to increase the production efficiency.

In the embodiment of the present invention, the emission face 10EF is formed with light emitting modules of multiple sizes. For example, the length of one side of a larger sized light emitting module is multiple times (times 2 or a larger integer) the length of a smaller sized light emitting module. In one example, the length of one side of a larger sized light emitting module is assumed to be twice the length of a smaller sized light emitting module. At this time, the size of the larger sized light emitting module is four times (2×2) the size of the smaller sized light emitting module. Four pieces of wiring for four smaller sized light emitting modules can be replaced with wiring used for one larger sized light emitting module. Four output parts in the drive circuit are replaced with one output part.

As described above, the light emitting device 110 of the embodiment can be structured such that the emission face 10EF is divided into regions where the amount of light in the regions is independently controlled in a simplified manner. This can reduce the number of parts. This can reduce the costs. This can achieve higher production efficiency.

In this embodiment, the first light emitting module 11 described above is an example of a larger sized light emitting module. Each of the plurality of second light emitting modules 12 described above is an example of a smaller sized light emitting module.

In this embodiment, for example, the shape of the first light emitting module 11 may be similar to the shape of a second light emitting module 12 that is multiple times larger (times 2 or a larger integer).

In the example shown in FIG. 1, the size of the first light emitting module 11 corresponds to the size of four second light emitting modules 12 combined. As illustrated in FIG. 1, the straight line which includes one side of a second light emitting module substantially overlaps with one side of a first light emitting module 11. This can make the outline of the emission face 10EF a quadrilateral when formed with the first light emitting modules 11 and the second light emitting modules 12. For example, the outline of the emission face 10EF is such that one side is along a first direction D1 and another side is along a second direction D2.

As shown in FIG. 1, one of the regions which include a plurality of second light emitting modules 12 is denoted as a first emission region 21 (indicated by broken lines in FIG. 1). The straight line that includes one side of the first emission region 21 substantially overlaps one side of the first emission module 11.

To simplify the explanation below, the up/down direction in the drawings will be referred to as the Y-axis direction, and the left/right direction the X-axis direction.

As one example, we focus one first light emitting module 11 and the first emission region 21 below the first light emitting module 11. The first emission region 21 includes a plurality of second light emitting modules 12. The first light emitting module 11 and the first emission region 21 will be explained below.

Figure 3:
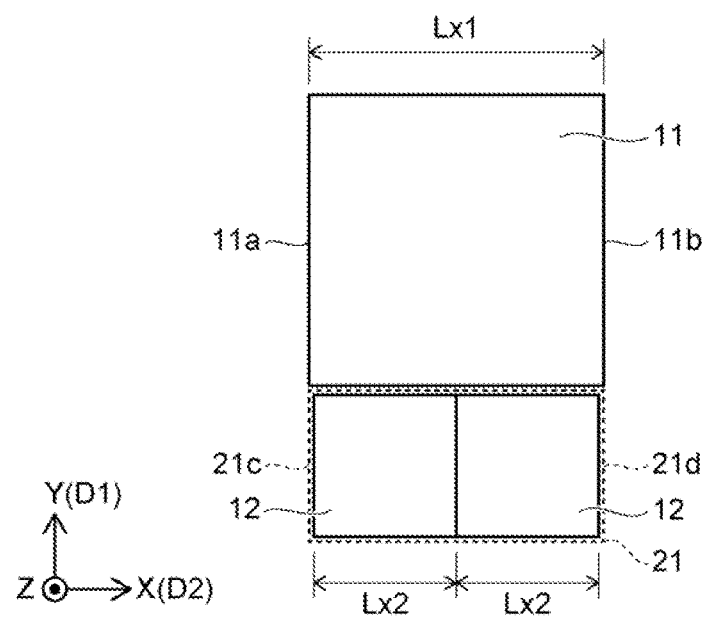
FIG. 3 is a schematic plan view illustrating by example a light emitting device according to the first embodiment.

FIG. 3 is a schematic plan view illustrating by example a light emitting device according to the first embodiment. In FIG. 3, some elements extracted from the light emitting device 110 are shown.

As shown in FIG. 3, the first light emitting module 11 includes a first side 11a and a second side 11b. The first side 11a and the second side 11b are along the first direction D1. The first direction D1, for example, is the Y-axis direction. The direction from the first side 11a to the second side 11b is along the second direction D2. The second direction D2 intersects with the first direction D1. The second direction D2 may be oblique to the first direction D1. In the explanation below, the second direction D2 is substantially perpendicular to the first direction D1. The second direction D2 corresponds to the X-axis direction.

The plurality of second light emitting modules 12 are lined up along the second direction D2. The direction from the second light emitting modules 12 to the first light emitting module 11 is along the first direction D1.

The first emission region 21 includes these second light emitting modules 12. The direction from the first emission region 21 to the first light emitting module 11 is along the first direction D1. The first emission region 21 includes a third side 21c and a fourth side 21d. The third side 21c and the fourth side 21d are along the first direction D1.

The direction from the third side 21c to the first side 11a is along the first direction D1. The direction from the fourth side 21d to the second side 11b is along the first direction D1.

For example, the straight line which includes the third side 21c substantially overlaps the first side 11a. The straight line which includes the fourth side 21d substantially overlaps the second side 11b.

With this construction, when the emission face 10EF is formed with the first module 11 and the plurality of second light emitting modules 12, the right and left edges of the emission face 10EF (edges arranged in the second direction D2) are essentially straight lines along the first direction D1 (see FIG. 1). For example, the emission face 10EF of the light emitting device 110 is a quadrilateral.

According to this embodiment, a desired emission face 10EF can be created with a simple structure. The use of light emitting modules having different sizes allows for a simple structure to control the emission states of multiple regions. In this manner, a desired emission state can be easily achieved. For example, when applied to a display device, a "desired black state" at a specific location can be achieved with a simple structure. According to this embodiment, a light emitting device having more functions can be provided with a simple structure.

In FIG. 3, for easier understanding, the first light emitting module 11 is drawn to be apart from the second light emitting modules 12. The first light emitting module 11 and the second light emitting modules 12 may be in contact with one another. There may be a minute gap provided between the first light emitting module 11 and the second light emitting modules 12.

In FIG. 3, a plurality of second light emitting modules 12 are in contact with one another. In the embodiment, there may be a slight gap provided between the second light emitting modules 12.

In FIG. 3, for easier understanding, the broken lines indicating the outline of the first emission region 21 are shifted from the solid lines that indicate the outlines of the second light emitting modules 12. The outer edges of the first emission region 21 are formed by the outer edges of the plural second light emitting modules 12. For example, the third side 21c of the first emission region 21 corresponds to a side of one of the second light emitting modules 12. For example, the fourth side 21d of the first emission region 21 corresponds to a side of another second light emitting module 12.

In the explanation below, the gap between the first light emitting module 11 and the second light emitting modules 12 will be ignored, and the gap between the multiple second light emitting modules 12 will be ignored.

For example, the distance from the first side 11a to the second side 11b along the second direction D2 is denoted as distance Lx1. The distance Lx1 corresponds to the length (size) of the first light emitting module 11 along the second direction D2. The length of one of the second light emitting modules 12 along the second direction D2 is denoted as length Lx2. The length Lx2 corresponds to the distance between two sides (two sides along the first direction D1 arranged in the second direction D2) included in one of the second light emitting modules 12. The distance Lx1 is substantially the same as the sum of the lengths Lx2 of the multiple second light emitting modules.

For example, the length along the second direction D2 of each second light emitting module 12 is the same, which is the length Lx2 described above. The distance Lx1 substantially corresponds to the product of the length Lx2 and the number of the second light emitting modules. For example, the distance Lx1 is the length Lx2 times 2 or a larger integer. For example, the distance Lx1 may be an even multiple of the length Lx2.

Figure 4:
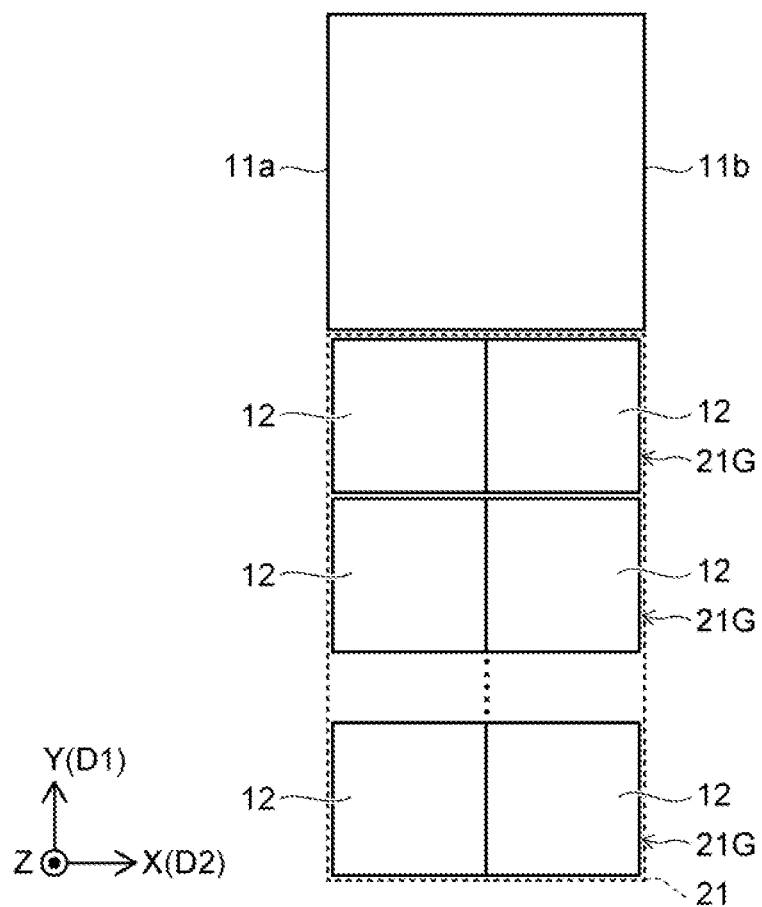
FIG. 4 is a schematic plan view illustrating by example a light emitting device according to the first embodiment.

FIG. 4 is a schematic plan view illustrating by example a light emitting device according to the first embodiment.

In FIG. 4, some elements extracted from the light emitting device 110 are shown.

As shown in FIG. 4, the first emission region 21 includes a plurality of groups 21G. At least one of the plurality of groups 21G may include a plurality of second light emitting modules 12. The plural second light emitting modules 12 in a group 21G are lined up along the second direction D2. The plurality of groups 21G are lined up along the first direction D1. As described later, a first light emitting module 11 may be disposed between one group 21G and another group 21G. A first light emitting module 11 may be disposed between a plurality of second light emitting modules 12.

As shown in FIG. 1, a plurality of second light emitting modules 12 may be further disposed in the left/right direction (left/right direction in FIG. 1) of the first light emitting modules 11.

Figure 5:
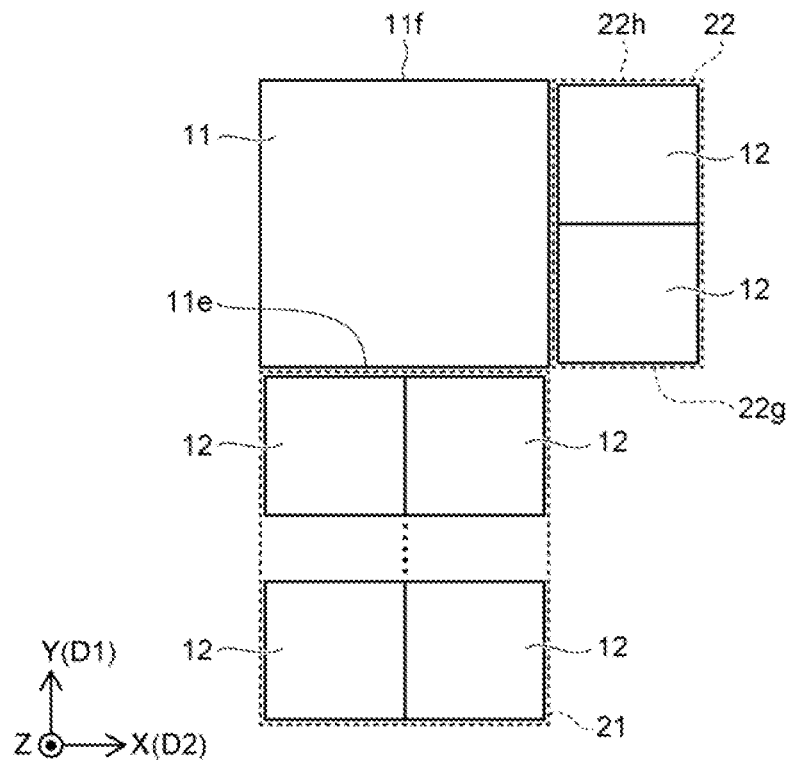
FIG. 5 is a schematic plan view illustrating by example a light emitting device according to the first embodiment.

FIG. 5 is a schematic plan view illustrating by example a light emitting device of the first embodiment. In FIG. 5, some elements extracted from the light emitting device 110 are shown.

As shown in FIG. 5, the light emitting device 110 may further include a second emission region 22 in addition to the first emission region 21. The second emission region 22 includes a plurality of second light emitting modules 12 lined up along the first direction D1. The direction from the first light emitting module 11 to the second emission region 22 is along the second direction D2.

The first light emitting module 11 includes a fifth side 11e and a sixth side 11f. The fifth side 11e and the sixth side 11f are along the second direction D2. The direction from the fifth side 11e to the sixth side 11f is along the first direction D1.

The second emission region 22 includes a seventh side 22g and an eighth side 22h. The seventh side 22g and the eighth side 22h are along the second direction D2. The direction from the seventh side 22g to the eighth side 22h is along the first direction D1.

The direction from the fifth side 11e to the seventh side 22g is along the second direction D2. The direction from the sixth side 11f to the eighth side 22h is along the second direction D2.

For example, the straight line that includes the seventh side 22g substantially overlaps the fifth side 11e. The straight line that includes the eighth side 22h substantially overlaps the sixth side 11f.

With such a structure, when the emission face 10EF is formed with the first light emitting module 11 and the second light emitting modules 12, the upper and lower edges of the emission face 10EF (edges arranged in the first direction D1) are substantially straight lines along the second direction D2 (see FIG. 1). For example, the emission face 10EF of the light emitting device 110 is essentially a quadrilateral formed with a single or plural first light emitting modules 11 and a plurality of second light emitting modules 12.

According to the embodiment, a desired emission face 10EF can be achieved with a simple structure. The use of light emitting modules having different sizes allows for a simple structure to control the emission states of multiple regions.

Figure 6:
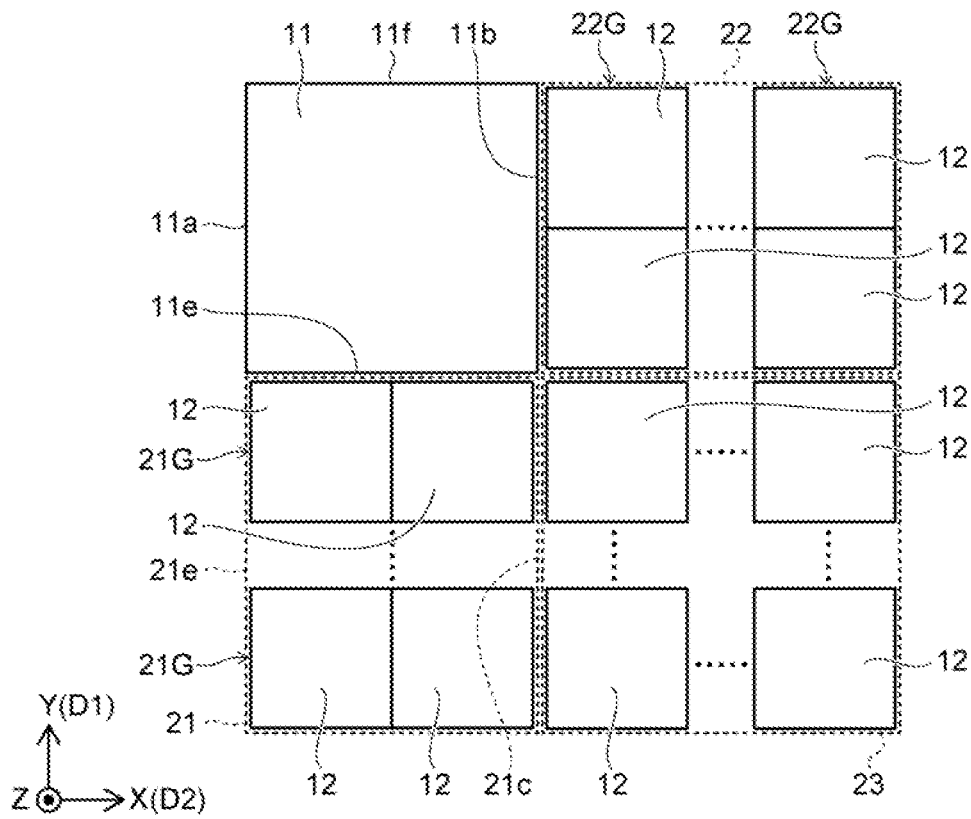
FIG. 6 is a schematic plan view illustrating by example a light emitting device according to the first embodiment.

FIG. 6 is a schematic plan view illustrating by example a light emitting device according to the first embodiment. FIG. 6 shows some of the elements included in the light emitting device 110.

As shown in FIG. 6, the second emission region 22 may include a plurality of groups 22G. At least one of the plurality of groups 22G may include a plurality of second light emitting modules 12. The plurality of groups 22G are lined up along the second direction D2. A first light emitting module 11 may be disposed between the multiple groups 22G.

As shown in FIG. 6, the light emitting device 110 may further include a third emission region 23. The third light emitting region 23 includes a plurality of second light emitting modules 12. For example, the direction from the first emission region 21 to the third emission region 23 is along the second direction D2. For example, the direction from the third emission region 23 to the second emission region 22 is along the first direction D1.

The plurality of second light emitting modules 12 included in the first emission region 21 and the plurality of second light emitting modules 12 included in the third emission region 23 are lined up along the second direction D2. The plurality of second light emitting modules 12 included in the third emission region 23 and the plurality of second light emitting modules 12 included in the second emission region 22 are lined up along the first direction D1.

With such a structure, for example, a quadrilateral emission face 10EF can be created.

Examples of the shapes of first light emitting module 11, second light emitting module 12, and emission face 10EF will be explained below.

Figure 7:
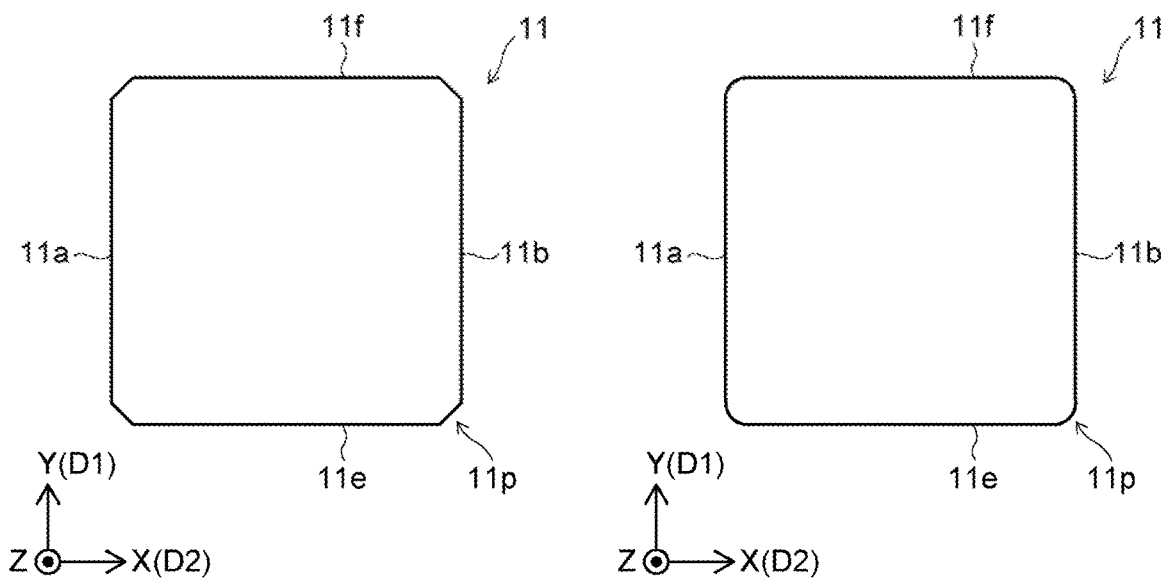
FIG. 7 includes schematic plan views illustrating by example a portion of a light emitting device according to the first embodiment.

FIG. 7 includes schematic plan views illustrating by example a portion of a light emitting device according to the first embodiment. FIG. 7 shows two examples of planar shapes of the first light emitting module 11.

As shown in FIG. 7, the first light emitting module 11 includes a first side 11a, a second side 11b, a fifth side 11e, and a sixth side 11f. As already explained, the first side 11a and the second side 11b are along the first direction D1. The fifth side 11e and the sixth side 11f are along the second direction D2. The direction from the first side 11a to the second side 11b is along the second direction D2. The direction from the fifth side 11e to the sixth side 11f is along the first direction D1.

Each corner portion 11p between two sides may be oblique to the first direction D1 and the second direction D2. In the example shown on the left in FIG. 7, the first light emitting module 11 is substantially an octagon. In the example shown on the right in FIG. 7, the corners 11p are curved. In this embodiment, the shape of the first light emitting module 11 can be modified in various ways.

Figure 8:
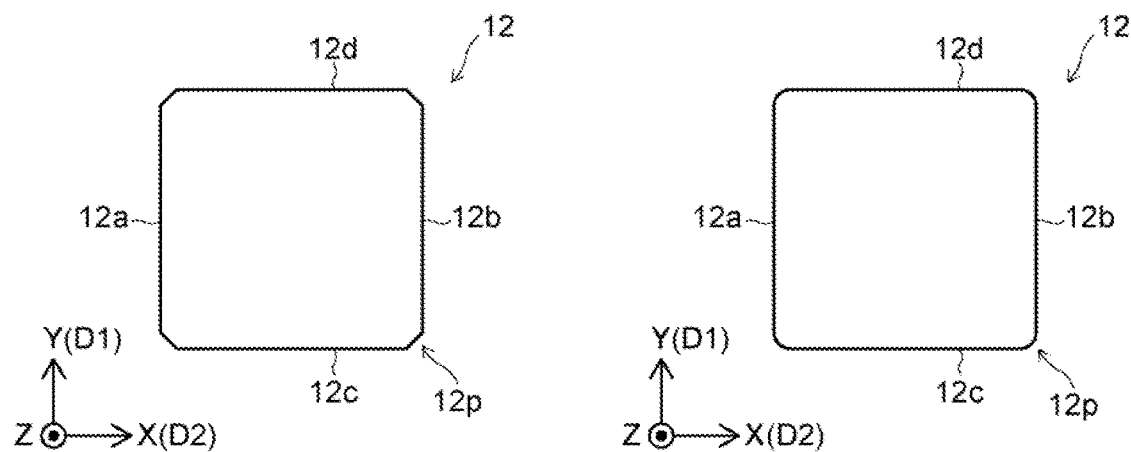
FIG. 8 includes schematic plan views illustrating by example a portion of a light emitting device according to the first embodiment.

FIG. 8 is a schematic plan view illustrating by example a portion of a light emitting device according to the first embodiment. FIG. 8 shows two examples of planar shapes of the second light emitting module 12.

As shown in FIG. 8, the second light emitting module 12 includes a side 12a, a side 12b, a side 12c, and a side 12d. The side 12a and the side 12b are along the first direction D1. The side 12c and the side 12d are along the second direction D2. The direction from the side 12a to the side 12b is along the second direction D2. The direction from the side 12c to the side 12d is along the first direction D1.

Each corner portion 12p between two sides may be oblique to the first direction D1 and the second direction D2. In the example shown on the left in FIG. 8, the second light emitting module 12 is substantially an octagon. In the example shown on the right in FIG. 8, the corners 12p are curved. In this embodiment, the shape of the second light emitting module 12 can be modified in various ways.

Figure 9:
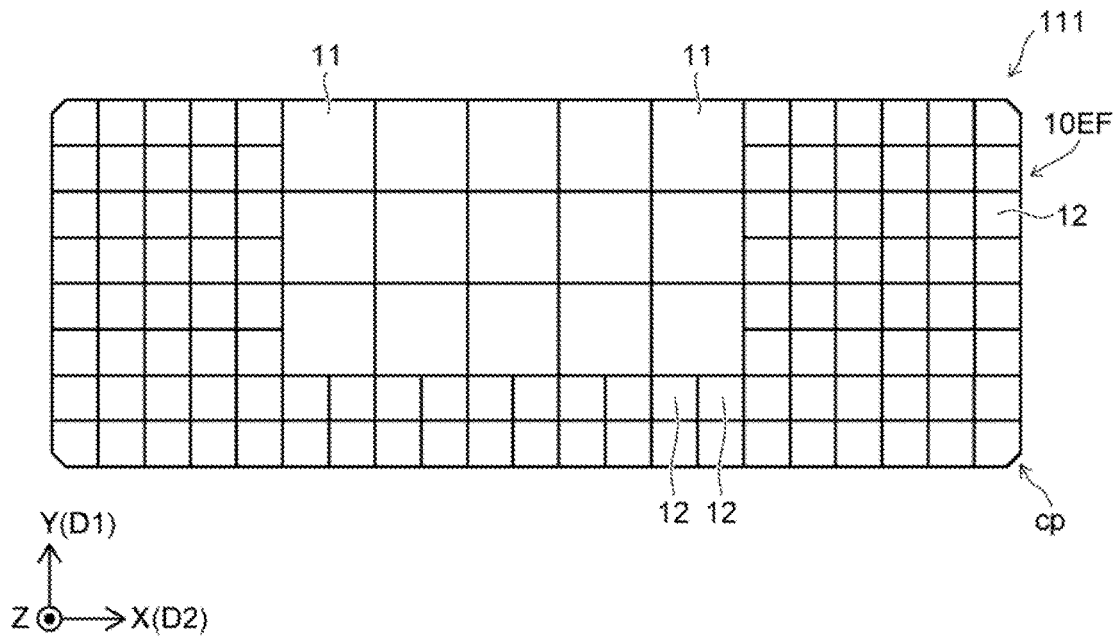
FIG. 9 is a schematic plan view illustrating by example a light emitting device according to the first embodiment.
Figure 10:
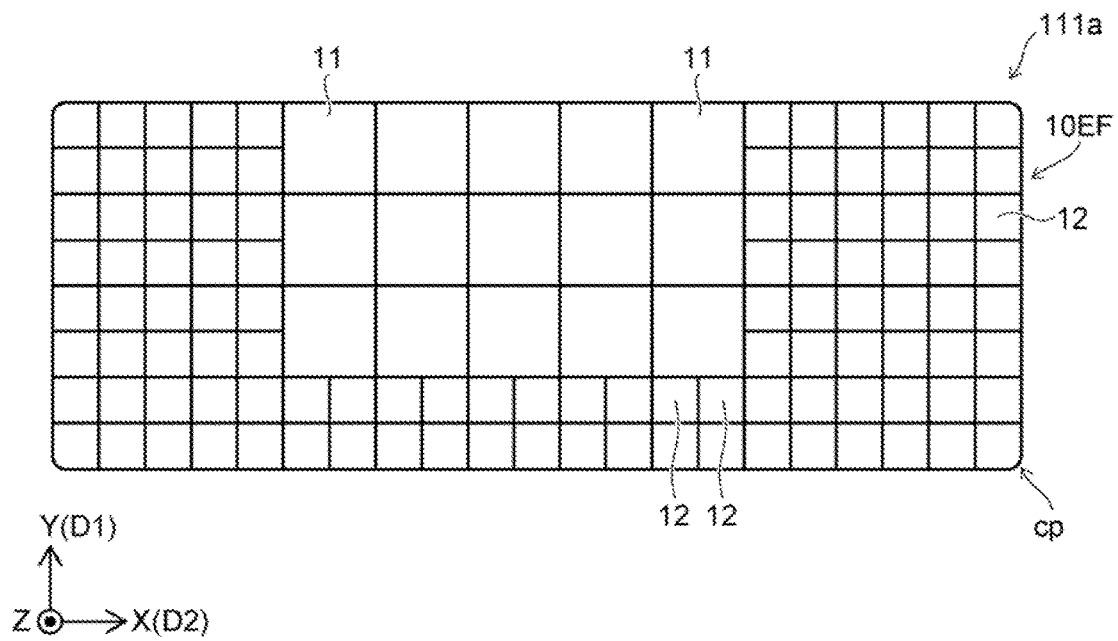
FIG. 10 is a schematic plan view illustrating by example a light emitting device according to the first embodiment.

FIG. 9 and FIG. 10 are schematic plan views illustrating by example a light emitting device according to the first embodiment.

These diagrams exemplify the planar shapes of the emission face 10EF of the light emitting device.

As shown in FIG. 9, in the light emitting device 111, the corner portions cp of the emission face 10EF are oblique to the sides of the emission face 10EF. The emission face 10EF is essentially an octagon.

As shown in FIG. 10, in the light emitting device 111a, the corner portions cp of the emission face 10EF are curved. In this embodiment, the shape of the emission face 10EF can be modified in various ways. As described later, light emitting modules shaped for the corner portions may be disposed at the corner portions cp of the emission face 10EF.

Figure 11:
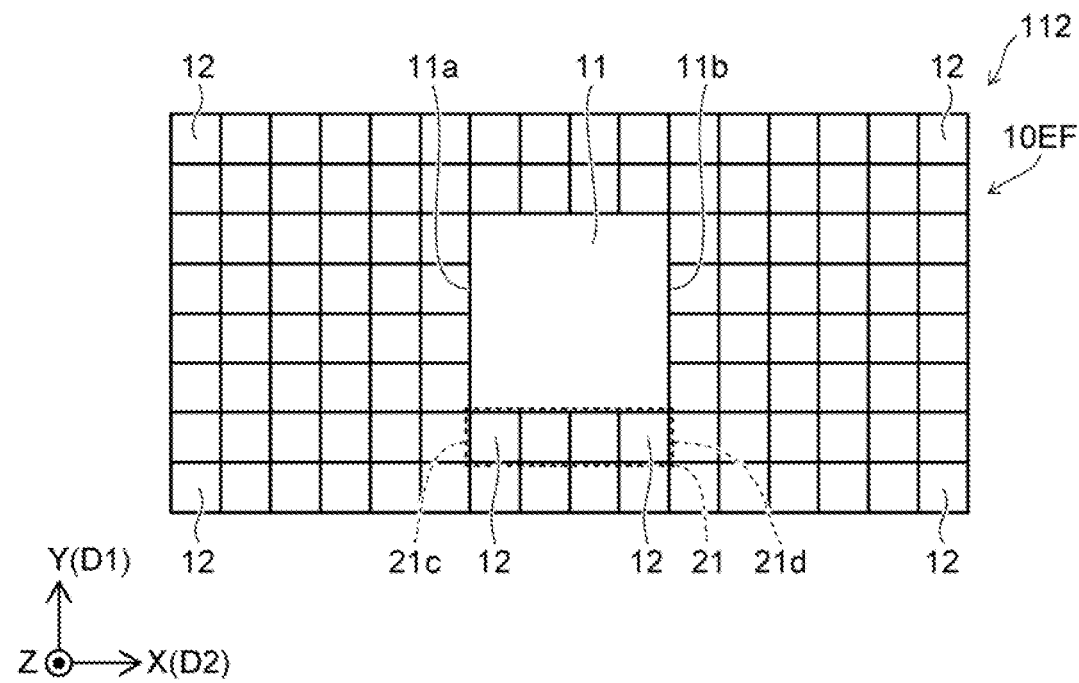
FIG. 11 is a schematic plan view illustrating by example a light emitting device according to the first embodiment.

FIG. 11 is a schematic plan view illustrating by example a light emitting device according to the first embodiment.

As shown in FIG. 11, in the light emitting device 112, a first emission region 21 is formed with four second light emitting modules 12. For example, the length of the first light emitting module 11 along the second direction D2 is four times the length of one second light emitting module 12 along the second direction D2. For example, the length of the first light emitting module 11 along the first direction D1 is four times the length of one second light emitting module 12 along the first direction D1.

For example, the ratio of the length of the first module 11 along the second direction D2 to the length of one second light emitting module 12 along the second direction D2 may be a multiple of two. For example, the ratio of the length of the first module 11 along the first direction D1 to the length of one second light emitting module 12 along the first direction D1 may be a multiple of two. This simplifies the design.

Figure 12:
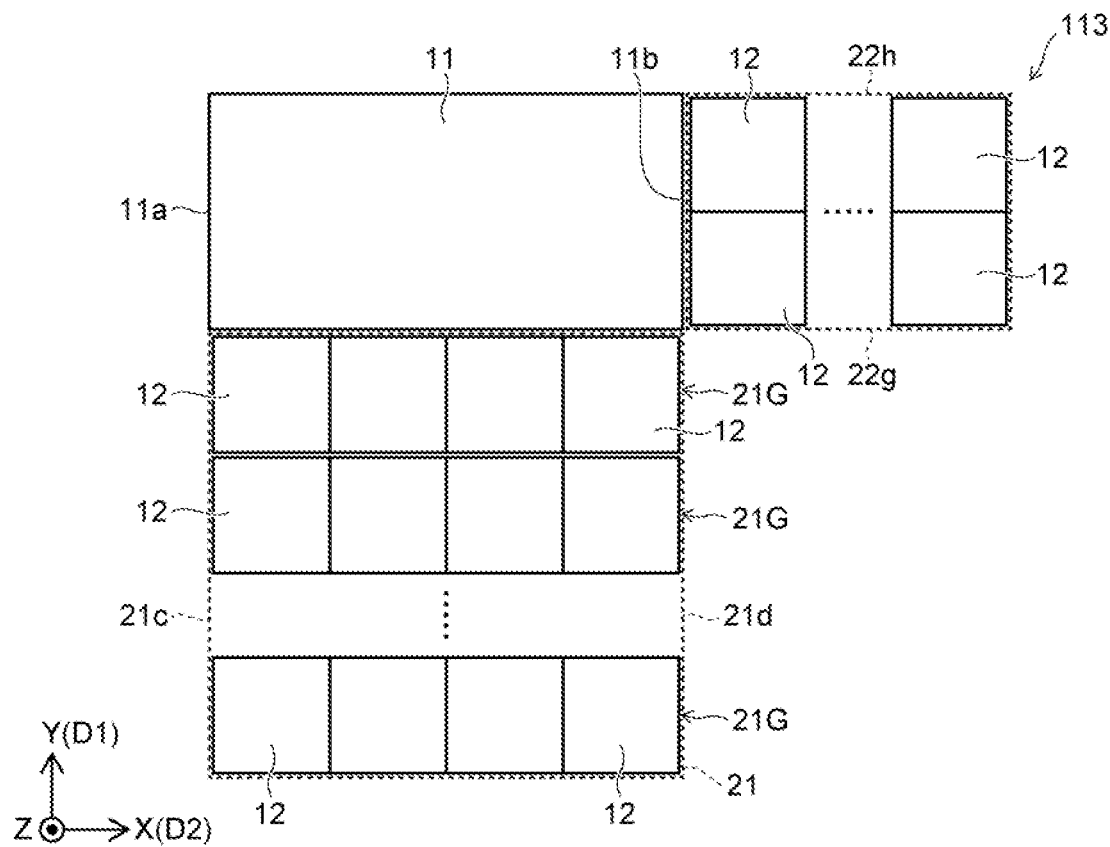
FIG. 12 is a schematic plan view illustrating by example a light emitting device according to the first embodiment.

FIG. 12 is a schematic plan view illustrating by example a light emitting device according to the first embodiment.

As shown in FIG. 12, in the light emitting device 113, the ratio of the length of the first light emitting module 11 along the second direction D2 to the length of one second light emitting module 12 along the second direction D2 is 4 to 1. On the other hand, the length of the first light emitting module 11 along the first direction D1 is twice the length of one second light emitting module 12 along the first direction D1.

As described above, the second ratio of the length of the first light emitting module 11 along the second direction D2 to the length of one second light emitting module 12 along the second direction D2 may differ from the first ratio of the length of the first light emitting module 11 along the first direction D1 to the length of one second light emitting module 12 along the first direction D1.

Figure 13:
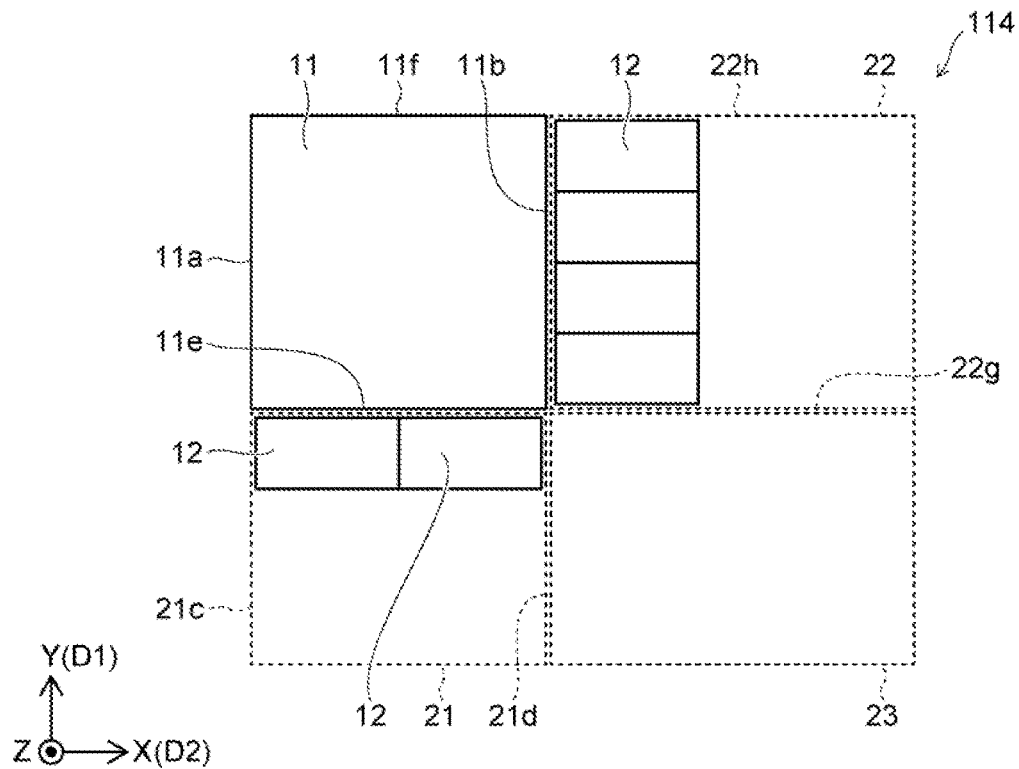
FIG. 13 is a schematic plan view illustrating by example a light emitting device according to the first embodiment.

FIG. 13 is a schematic plan view illustrating by example a light emitting device according to the first embodiment. As shown in FIG. 13, in the light emitting device 114, the length of a second light emitting module 12 along the first direction D1 may be different from the length of the second light emitting module 12 along the second direction D2. In this case, the length of the first light emitting module 11 along the first direction D1 may be the same as the length along the second direction D2. For example, the ratio of the length of a second light emitting module 12 along the second direction D2 to the length along the first direction D1 may be 2, or a higher integer, to 1. Alternatively, for example, the ratio of the length of a second light emitting module 12 along the first direction D1 to the length along the second direction D2 may be 2, or a higher integer, to 1.

Examples of light emitting elements disposed in the first light emitting modules 11 and the second light emitting modules 12 will be explained below.

Figure 14:
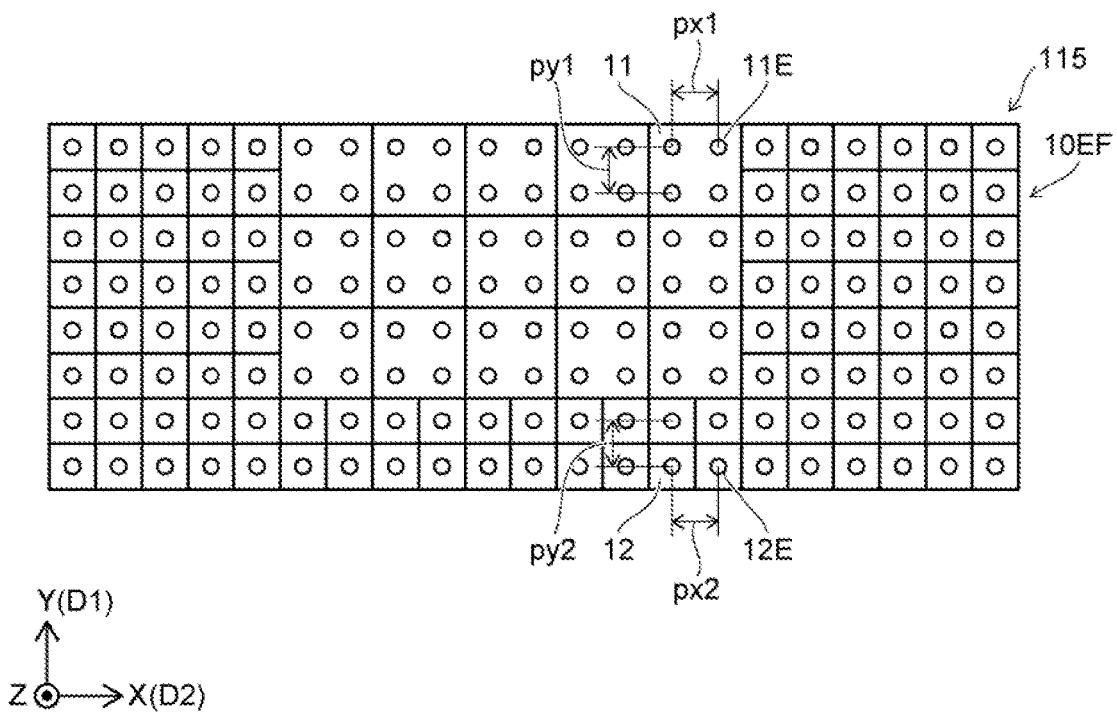
FIG. 14 is a schematic plan view illustrating by example a light emitting device according to the first embodiment.

FIG. 14 is a schematic plan view illustrating by example a light emitting device according to the first embodiment. As shown in FIG. 14, in the light emitting device 115, a first light emitting module 11 includes a first light emitting element 11E. At least one of the plurality of second light emitting modules 12 (in certain examples, each of the plurality of second light emitting modules 12) may include a light emitting element 12E. The light emitted from these light emitting elements become the light output from the emission face 10EF.

In the example shown in FIG. 14, a first light emitting module 11 is provided with a plurality of first light emitting elements 11E. For example, the pitch for the plurality of first light emitting elements 11E is substantially the same as the pitch for the plurality of second light emitting elements 12E. A pitch is a unit length for repeated positions. Employing substantially the same pitch can improve the in-plane brightness uniformity of the emission face 10EF.

For example, the pitch for the plurality of first light emitting elements 11E in the first direction D1 is denoted as pitch py1. The pitch py1 corresponds to the distance between the position of "one of the plurality of first light emitting elements 11E" in the first direction D1 and the position of "another of the plurality of first light emitting element 11E" that is adjacent thereto in the first direction D1.

For example, the pitch for the plurality of first light emitting elements 11E in the second direction D2 is denoted as pitch px1. The pitch px1 corresponds to the distance between the position of "one of the plurality first light emitting elements 11E" in the second direction D2 and the position of "another of the plurality first light emitting element 11E" that is adjacent thereto along the second direction D2.

For example, the pitch for the plurality of second light emitting elements 12E in the first direction D1 is denoted as pitch py2. The pitch py2 corresponds to the distance between the position of "one of the second light emitting elements 12E" in the first direction D1 and the position of "another second light emitting element 12E" that is adjacent thereto in the first direction D1.

For example, the pitch for the second light emitting elements 12E in the second direction D2 is denoted as pitch px2. The pitch px2 corresponds to the distance between the position of "one of the plurality of second light emitting elements 12E" in the second direction D2 and the position of "another of the plurality of second light emitting element 12E" that is adjacent thereto in the second direction D2.

The "position of a light emitting element in the first direction D1," for example, is the central position in the first direction D1 of the light emitting element in the first direction D1. The "position of a light emitting element in the second direction D2," for example, is the central position in the second direction D2 of a light emitting element in the second direction D2.

In the light emitting device 115, the pitch py1 is substantially the same as the pitch py2. The pitch py1, for example, is 0.9 to 1.1 times the pitch py2. The pitch px1 is substantially the same as the pitch px2. The pitch px1 is, for example, 0.9 to 1.1 times the pitch px2.

In one example of the embodiment, the pitch px1 is the same as the pitch py1. In another example, the pitch px1 is different from the pitch py1. In one example of the embodiment, the pitch px2 is the same as the pitch py2. In another example, the pitch px2 is different from the pitch py2.

In the example of the light emitting device 115, a second light emitting element 12E is provided per second light emitting module 12. In this case, the pitch py2 corresponds to the pitch for the plurality of second light emitting modules 12 in the first direction D1. The pitch px2 corresponds to the pitch for the plurality of second light emitting modules 12 in the second direction D2.

Figure 15:
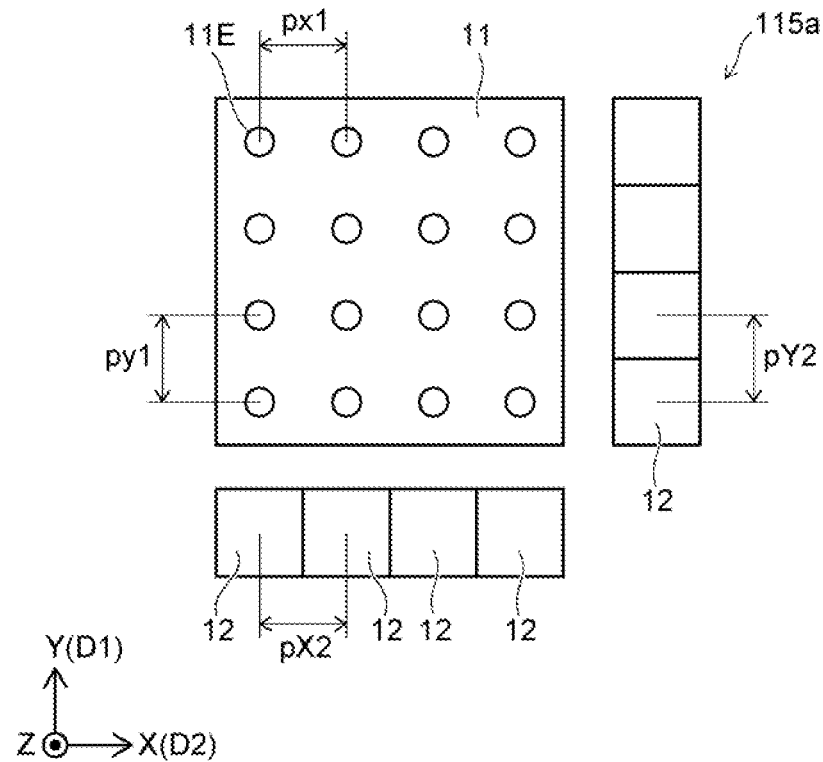
FIG. 15 is a schematic plan view illustrating by example a light emitting device according to the first embodiment.

FIG. 15 is a schematic plan view illustrating by example a light emitting device according to the first embodiment. As shown in FIG. 15, in the light emitting device 115a, a first light emitting module 11 is provided with a plurality of first light emitting elements 11E. In this example, the first light emitting elements 11E are disposed in a 4×4 matrix.

In this example, the pitch py1 for the first light emitting elements 11E in the first direction D1 is essentially the same as the pitch pY2 for the plurality of second light emitting modules 12 in the first direction D1. The pitch px1 for the first light emitting elements 11E in the second direction D2 is substantially the same as the pitch pX2 for the plurality of second light emitting modules 12 in the second direction D2.

The pitch pY2 for the plurality of light emitting modules 12 in the first direction D1 corresponds to, for example, the distance along the first direction D1 between the center of "one of the plurality of light emitting modules 12" in the first direction D1 and the center of "another of the plurality of light emitting module 12" that is adjacent thereto in the first direction D1.

The pitch pX2 for the light emitting modules 12 in the second direction D2 corresponds to, for example, the distance along the second direction D2 between the center of "one of the light emitting modules 12" in the second direction D2 and the center of "another light emitting module 12" that is adjacent thereto in the second direction D2.

Figure 16:
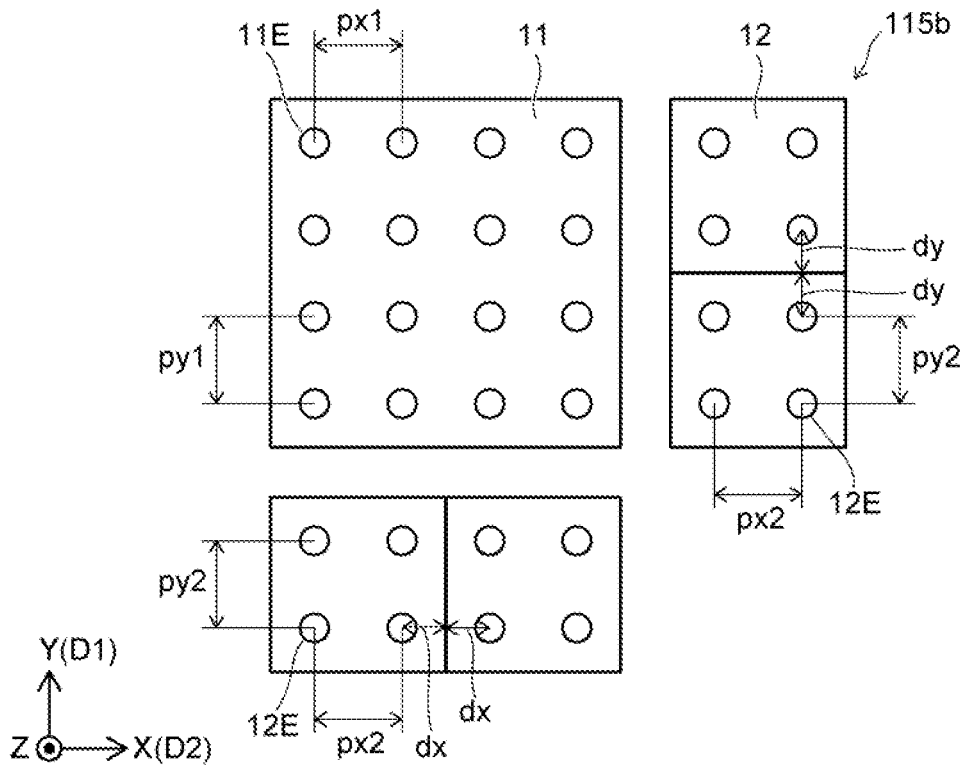
FIG. 16 is a schematic plan view illustrating by example a light emitting device according to the first embodiment.

FIG. 16 is a schematic plan view of a light emitting device according to the first embodiment. As shown in FIG. 16, in the light emitting device 115b, the first light emitting module 11 includes a plurality of first light emitting elements 11E. At least one of the plurality of second light emitting modules 12 includes a plurality of second light emitting elements 12E.

The pitch py1 for the first light emitting elements 11E along the first direction D1 is substantially the same as the pitch py2 for the plurality of second light emitting elements 12E along the first direction D1. The pitch px1 for the first light emitting elements 11E along the second direction D2 is substantially the same as the pitch px2 for the plurality of second light emitting elements 12E along the second direction D2. With such a structure, the in-plane brightness uniformity of the emission face 10EF can be enhanced.

The second light emitting elements 12E included in the plurality of second light emitting modules may be arranged at substantially the same pitch. For example, the distance dy between one side of a second light emitting module 12 and the center of the second light emitting element 12E closest to that side in the first direction D1 may be one half of the pitch py2. For example, the distance [dx] between one side of a second light emitting module 12 and the center of the second light emitting element 12E closest to that side in the second direction D2 may be one half of the pitch px2.

For example, the distance between the center of a second light emitting element 12E included in a second light emitting module 12 and the center of a second light emitting element 12E included in the adjacent second light emitting module 12 adjacent thereto may be the same as the pitch py2 or the pitch px2.

This structure provides constant spacing between the plurality of second light emitting elements 12E in the plurality of second light emitting modules 12. This, for example, improves the in-plane uniformity of light.

Figure 17:
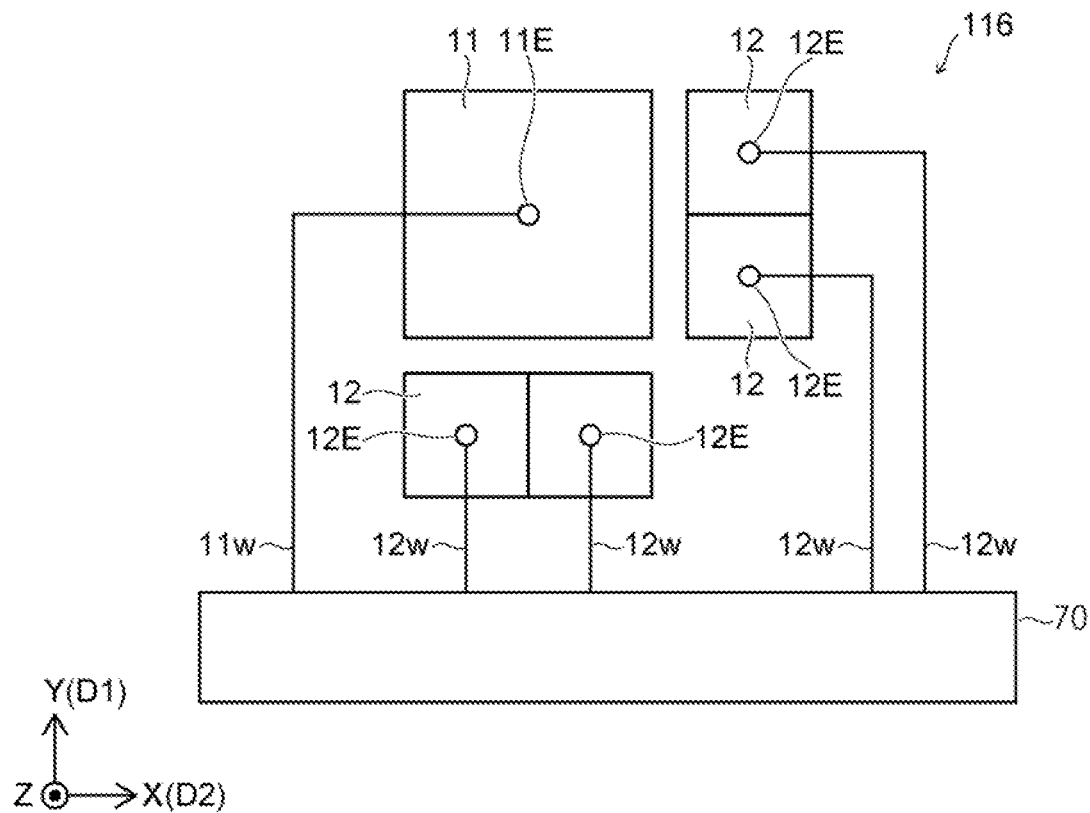
FIG. 17 is a schematic plan view illustrating by example a light emitting device according to the first embodiment.

FIG. 17 is a schematic plan view illustrating by example a light emitting device according to the first embodiment. As shown in FIG. 17, the light emitting device 116 includes a circuit part 70. The circuit part 70 is electrically connected to the first light emitting elements 11E included in the first light emitting module 11 using a wire 11w. The circuit part 70 is electrically connected to the second light emitting elements 12E included in the second light emitting modules 12 using wires 12w. The current supplied from the circuit part 70 allows the first light emitting element 11E and the second light emitting elements 12E to emit light.

The circuit part 70 may be adapted to independently control the current supplied to the first light emitting element 11E (first current) and the current supplied to the second light emitting elements 12E (second current). For example, the circuit part 70 may control at least one of the first current and the second current such that the brightness per unit area of the first light emitting module is substantially the same as the brightness per unit area of the second light emitting modules. This can make the in-plane brightness of the emission face 10EF uniform.

Figure 18:
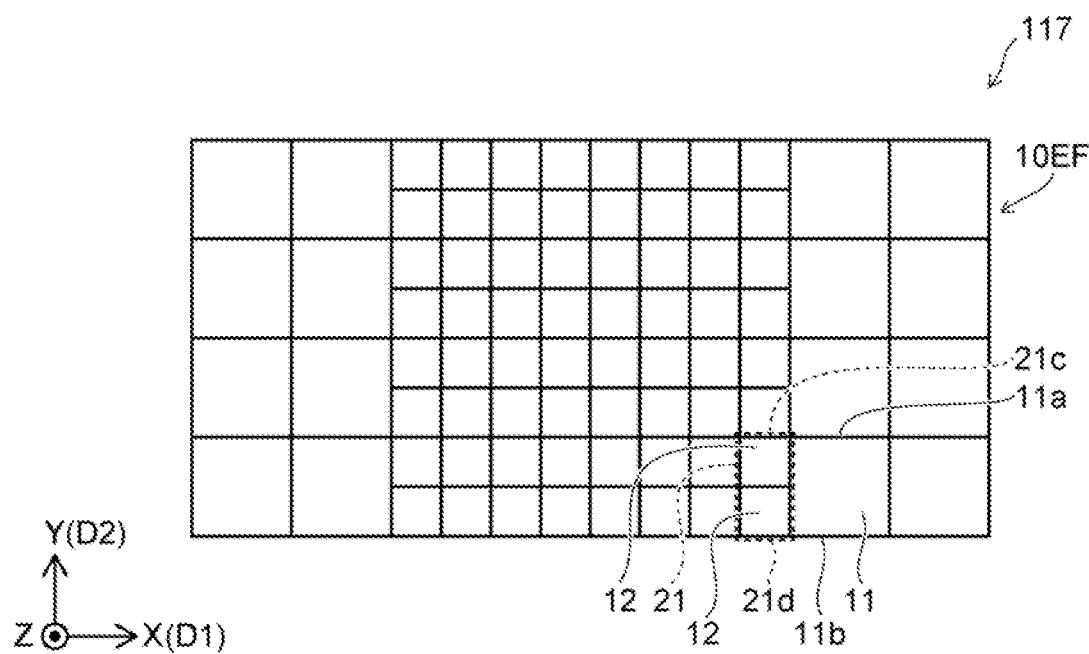
FIG. 18 is a schematic plan view illustrating by example a light emitting device according to the first embodiment.

FIG. 18 is a schematic plan view illustrating by example a light emitting device according to the first embodiment. As shown in FIG. 18, the light emitting device 117 is also provided with first light emitting modules 11 and second light emitting modules 12. In this example, the first direction D1 corresponds to the X-axis direction, and the second direction D2 corresponds to the Y-axis direction. In this example, the second light emitting modules 12 are disposed between multiple first light emitting modules 11.

Figure 19:
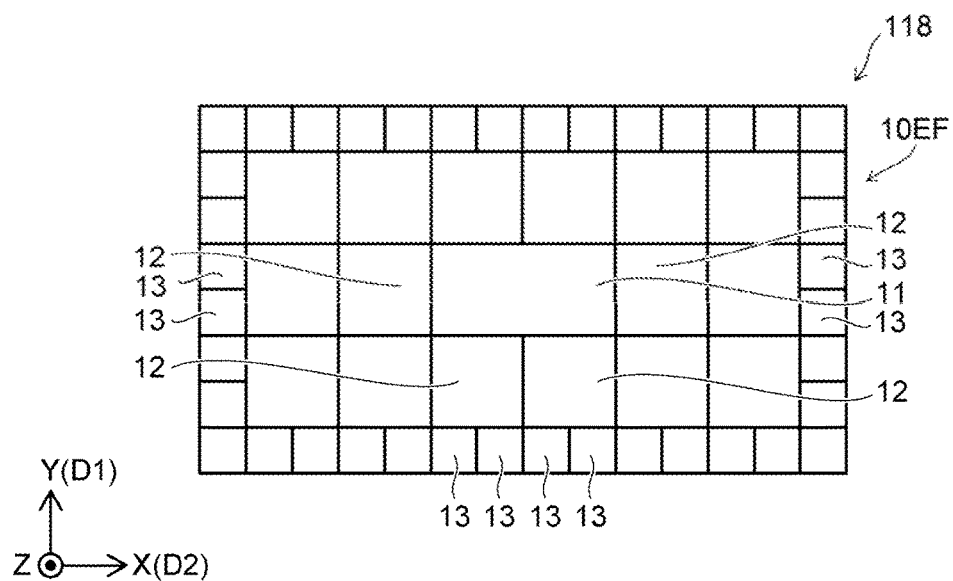
FIG. 19 is a schematic plan view illustrating by example a light emitting device according to the first embodiment.

FIG. 19 is a schematic plan view illustrating by example a light emitting device according to the first embodiment. As shown in FIG. 19, in the light emitting device 118, light emitting modules of three different sizes are disposed.

In this example, the length of the first light emitting module 11 along the second direction D2 is twice the length of a second light emitting module 12 along the second direction D2. The former may be the latter times 2 or a larger integer. The length of the first light emitting module 11 along the first direction D1 may be the length of a second light emitting module 12 along the first direction D1 times 1 or a larger integer.

In this example, the length of a second light emitting module 12 along the second direction D2 is twice the length of a third light emitting module 13 along the second direction D2. The former may be the latter times 2 or a larger integer. The length of a second light emitting module 12 along the first direction D1 is twice the length of a third light emitting module 13 along the first direction D1. The former may be the latter times 2 or a larger integer.

The third light emitting module 13 may be considered as a "second light emitting module." The second light emitting module 12 may be considered as a "first light emitting module."

Figure 20:
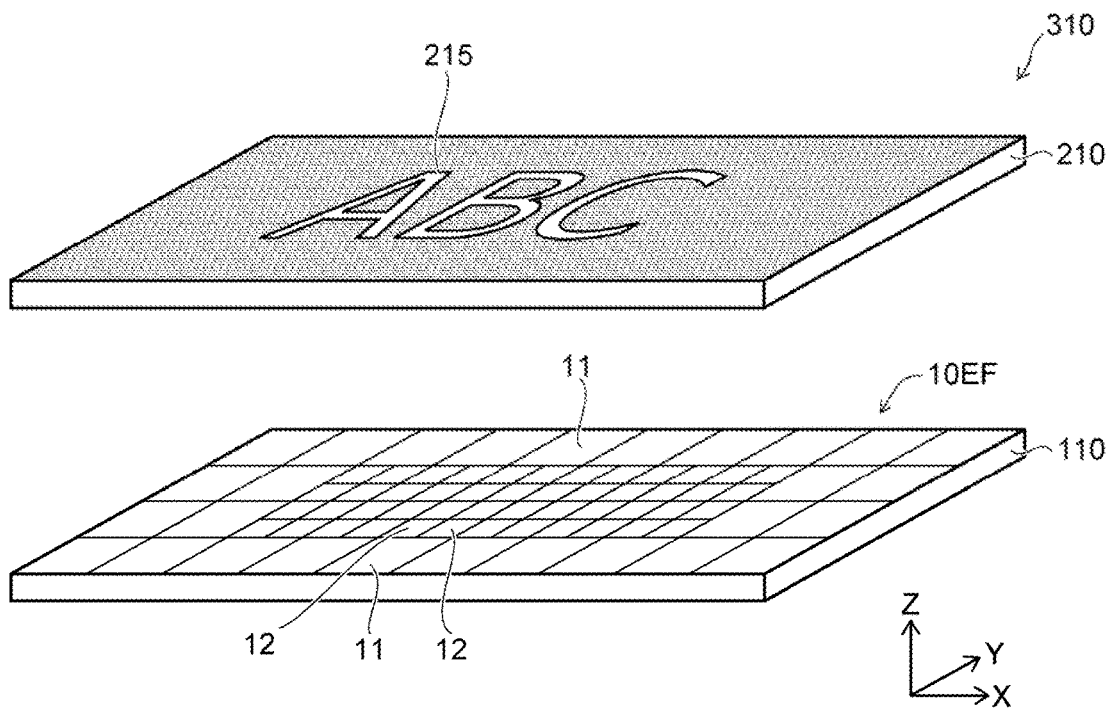
FIG. 20 is a schematic diagram of an application example of a light emitting device according to the first embodiment.

FIG. 20 is a schematic diagram illustrating an application example of a light emitting device according to the first embodiment. As shown in FIG. 20, for example, a display panel 210 is laid over the light emitting device 110. In the example shown in FIG. 20, when turned on, a specific display pattern is displayed at a specific position of the display panel 210 (in this example, "ABC" display pattern 215). The background of the display pattern, for example, is displayed in a dark state. Specific letters or shapes are displayed in a bright state. In this embodiment, the intensity of light in the area excluding the specific bright state region is set lower than the intensity of the light in the specific bright state region. In this manner, a "desired dark state" is achieved and a desired display pattern is displayed in a desired state. Such a light intensity control is applied by the circuit part 70 (e.g., see FIG. 17).

Figure 21:
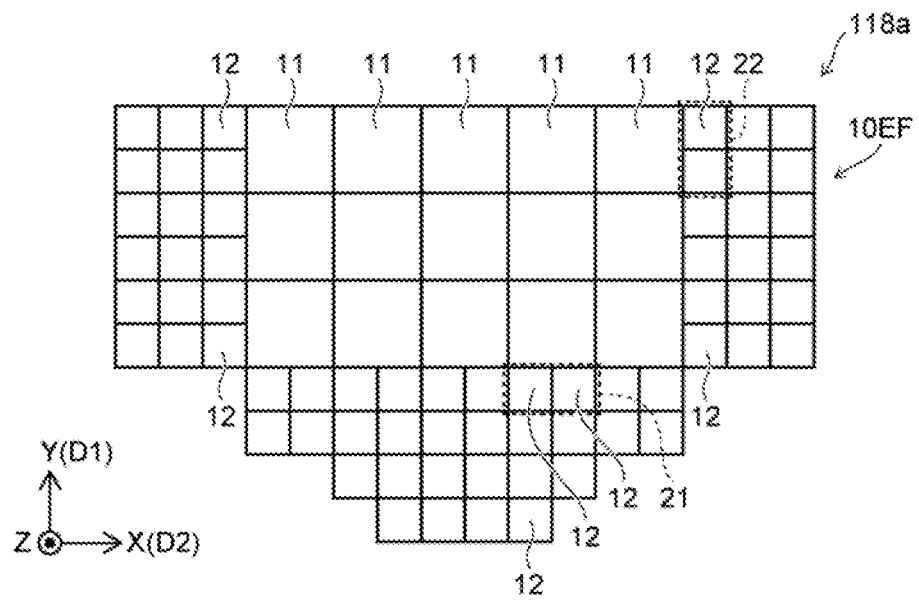
FIG. 21 is a schematic plan view illustrating by example a light emitting device according to the first embodiment.
Figure 22:
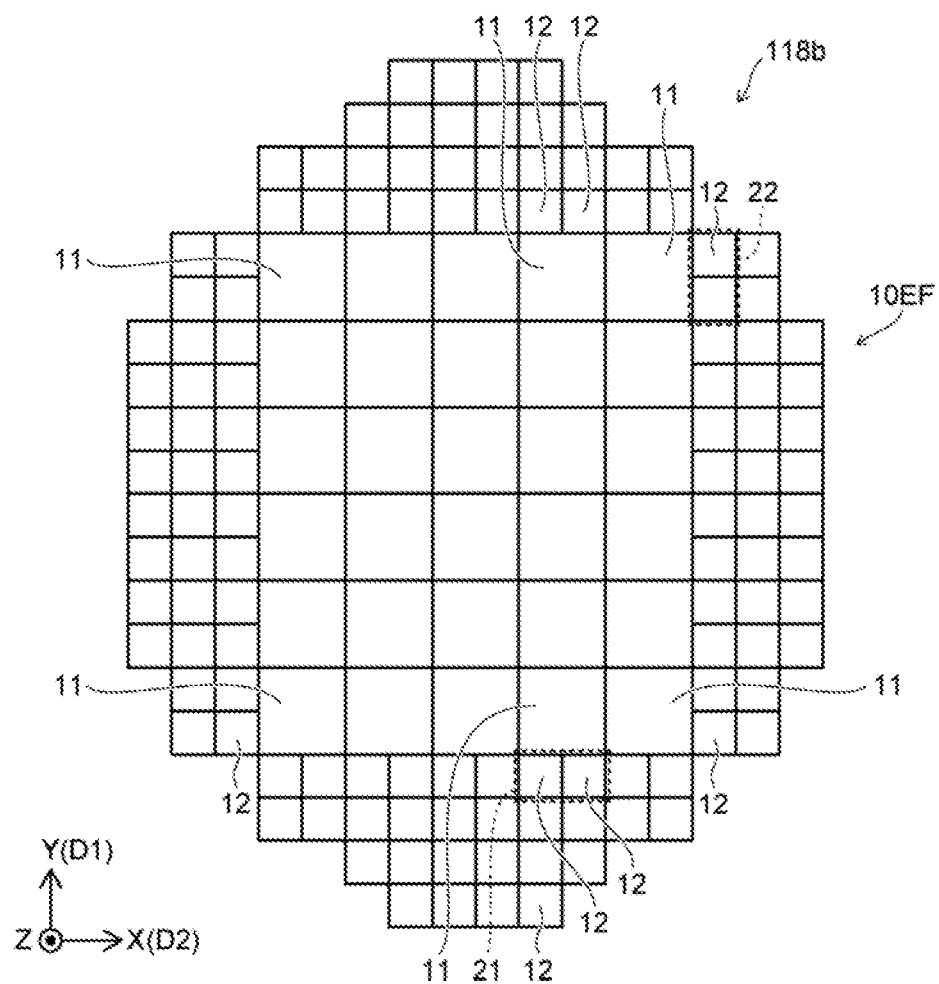
FIG. 22 is a schematic plan view illustrating by example a light emitting device according to the first embodiment.

FIG. 21 and FIG. 22 are schematic plan views illustrating light emitting devices according to the first embodiment. As shown in FIG. 21, in the light emitting devices 118a and 118b, the emission faces 10EF are formed with a plurality of first light emitting modules 11 and a plurality of second light emitting modules 12. The emission faces 10EF may have any given shape in addition to a quadrilateral such as that shown in FIG. 1.

In these examples of light emitting devices 118a and 118b, the length of one side of a first light emitting module 11 along the first direction D1 is substantially the length of one side of a second light emitting module 12 along the first direction D1 times 2 or a larger integer. The length of one side of a first light emitting module 11 along the second direction D2 is substantially the length of one side of a second light emitting module 12 along the second direction D2 times 2 or a larger integer. For example, an emission face 10EF can be formed into a variety of shapes using two types of light emitting modules.

Second Embodiment

Figure 23:
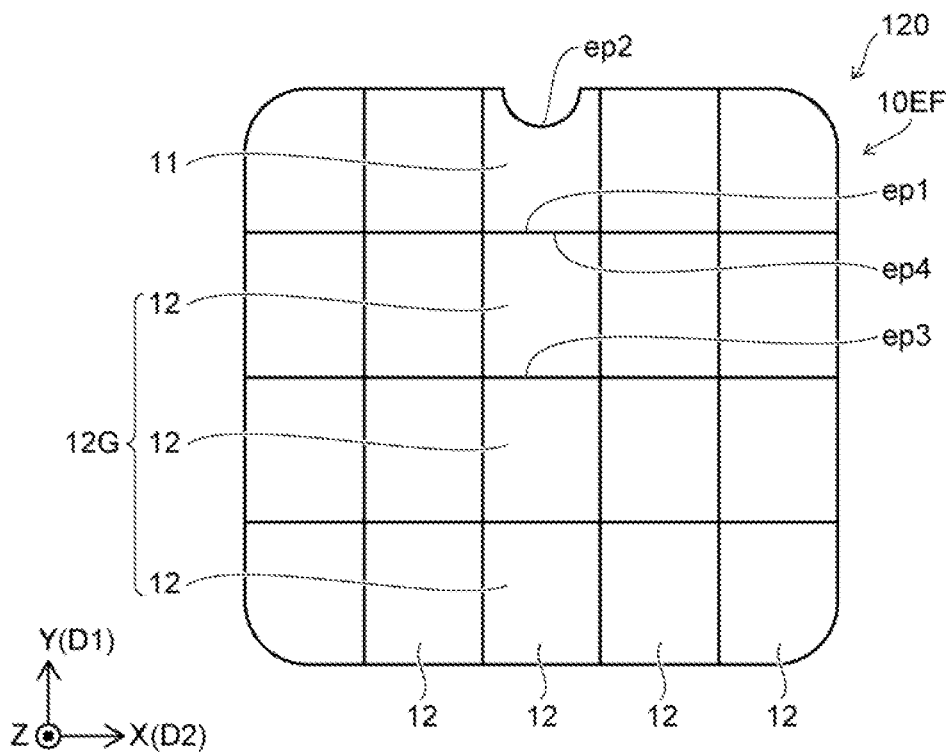
FIG. 23 is a schematic plan view illustrating by example a light emitting device according to a second embodiment of the present disclosure.

FIG. 23 is a schematic plan view illustrating by example a light emitting device according to a second embodiment of the present disclosure. As shown in FIG. 23, the light emitting device 120 according to this embodiment includes a first light emitting module 11 and a group 12G. The group 12G includes a plurality of second light emitting modules 12.

The plurality of second light emitting modules 12 are lined up along the first direction D1. The first direction D1, for example, is the Y-axis direction.

The first light emitting module 11 is disposed at one end of the group 12G described above. The direction from the group 12G to the first light emitting module 11 is along the first direction D1.

As shown in FIG. 23, the shape of the first light emitting module 11 differs from the shape of each second light emitting module 12. For example, the shapes of the second light emitting modules 12 are the same, which is substantially a quadrilateral, for example. The shape of the first light emitting module 11 disposed at one column end of the group 12G is different from the shape of the second light emitting modules 12. In this manner, even in the case where the overall shape of the emission face 10EF is substantially quadrilateral, a portion of the outline of the emission face 10EF can have any shape.

For example, there are instances where a component, such as a switch or camera, is disposed along the outline of the light emitting device 120. The emission face 10EF can be desirably shaped in order to achieve the shape to accommodate such a component. In this example, the inner portion of the emission face 10EF (the central portion) is formed with a plurality of second light emitting modules 12. This can achieve an emission face 10EF of a given size with a simple structure. For example, this can easily create a device in response to a variety of product design requirements.

As described above, according to this embodiment, the outline of the emission face 10EF can be desirably shaped in a simple manner. This can provide a light emitting device having more functions.

For example, as shown in FIG. 23, the first light emitting module 11 includes a first edge ep1 and a second edge ep2. The first edge ep1 is located between the second edge ep2 and the first group 12G in the first direction D1. A second light emitting module 12 includes a third edge ep3 and a fourth edge ep4. The fourth edge ep4 is located between the third edge ep3 and the first light emitting module 11 in the first direction D1.

In this embodiment, the fourth edge ep4 is along the first edge ep1. For example, the first edge ep1 and the fourth edge ep4 are along the direction that intersects with the first direction D1 (i.e., along the second direction D2 in this example). The third edge ep3 is substantially in parallel with the first edge ep1. The shape of the second edge ep2 is different from the shape of the fourth edge ep4. In this example, at least one portion of the second edge ep2 is concave from the second edge ep2 towards the first edge ep1. For example, a component such as a switch may be disposed in the position corresponding to the concave part. The second edge ep2 may have multiple concave parts.

The first light emitting module 11 may be disposed at a corner of the emission face 10EF. Another example of the first light emitting module 11 will be explained below.

Figure 24:
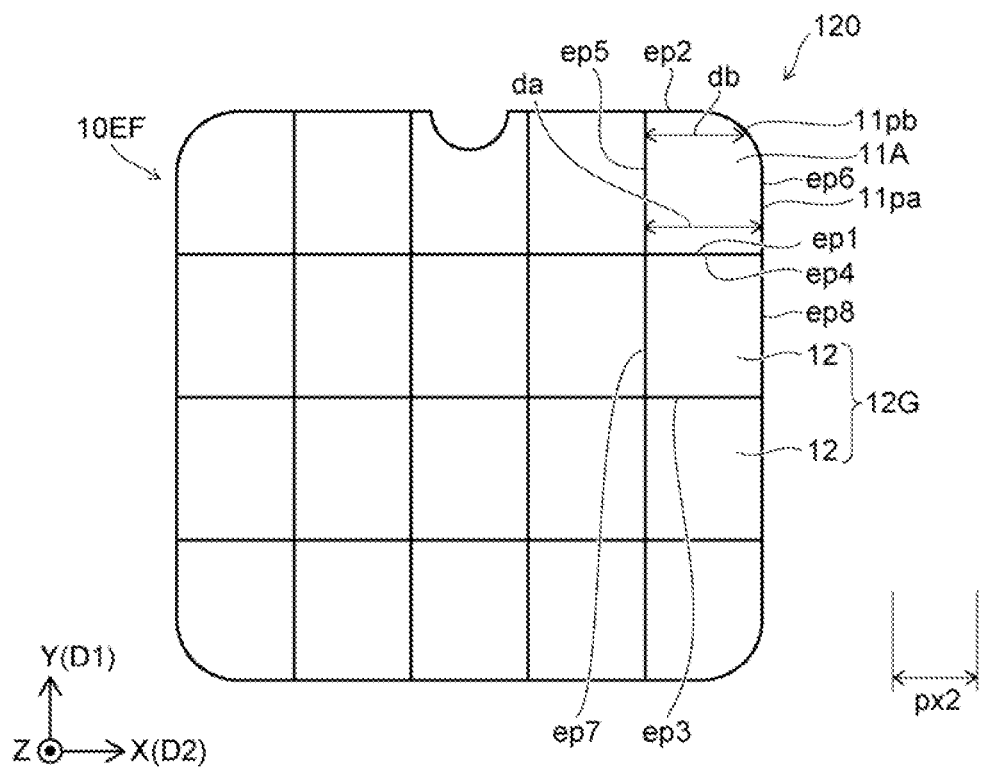
FIG. 24 is a schematic plan view illustrating by example a light emitting device according to the second embodiment.

FIG. 24 is a schematic plan view illustrating by example a light emitting device according to the second embodiment. As shown in FIG. 24, in the light emitting device 120, the light emitting module disposed at a corner of the emission face 10EF may be considered as the first light emitting module 11A. In this case, the first light emitting module 11A is also disposed at one end of the group 12G which includes a plurality of second light emitting modules 12. The direction from the group 12G to the first light emitting module 11A is along the first direction D1. The shape of the first light emitting module 11A is different from that of each second light emitting module 12.

In this example, the first light emitting module 11A includes a first edge ep1 and a second edge ep2. The first edge ep1 is located between the second edge ep2 and the group 12G in the first direction D1. A second light emitting module 12 includes a third edge ep3 and a fourth edge ep4. The fourth edge ep4 is located between the third edge ep3 and the first light emitting module 11A in the first direction D1. The fourth edge ep4 is along the first edge ep1. The first edge ep1, the fourth edge ep4, and the third edge ep3 are along the direction that intersects with the first direction D1 (i.e., along the second direction D2 in this example). The shape of the second edge ep2 is different from the shape of the fourth edge ep4. For example, the length of the straight line portion of the second edge ep2 is shorter than the straight line portion of the fourth edge ep4.

For example, the shape of the edge of the first light emitting module 11A along the second direction D2 is different from the shapes of the edges of the second light emitting modules 12 in the second direction D2.

For example, the first light emitting module 11A includes a fifth edge ep5 and a sixth edge ep6. The direction from the fifth edge ep5 to the sixth edge ep6 is along the second direction D2 that intersects with the first direction D1. A second light emitting module 12 includes a seventh edge ep7 and an eighth edge ep8. The direction from the seventh edge ep7 to the fifth edge ep5 is along the first direction D1. The direction from the eighth edge ep8 to at least a portion of the sixth edge ep6 is along the first direction D1.

In this example, the seventh edge ep7 is an edge that is positioned on the inside of the emission face 10EF. The eighth edge ep8 is an edge that is positioned on the outside of the emission face 10EF. The fifth edge ep5 is an edge that is positioned on the inside of the emission face 10EF. The sixth edge ep6 is an edge that is positioned on the outside of the emission face 10EF. The sixth edge ep6 and the second edge ep2 correspond to a corner of the emission face 10EF.

The sixth edge ep6 includes a first portion 11pa and a second portion 11pb. The position of the first portion 11pa in the first direction D1 is between the position of the second portion 11pb in the first direction D1 and the position of the eighth edge ep8 in the first direction D1. The second portion 11pb corresponds to the region on the second light emitting module 12 side.

In the light emitting device 120, the distance db along the second direction D2 between at least a part of the second portion 11pb and the fifth edge ep5 is shorter than the distance da along the second direction D2 between the first portion 11pa and the fifth edge ep5. For example, the fifth edge ep5, the seventh edge ep7, and the eighth edge ep8 are along the first direction D1, and at least a part of the second portion 11pb is oblique to the first direction D1.

For example, the second portion 11pb recedes in the direction from the sixth edge ep6 to the fifth edge ep5 using the first portion 11pa as a reference. The second portion 11pb is oblique to the first direction D1 and the second direction D2. The second portion 11pb corresponds to a corner portion. In this example, the second portion 11pb is curved.

Disposing such a second portion 11pb forms a curved corner portion in the emission face 10EF. By disposing such a second portion 11pb, an emission face 10EF with oblique or curved corners can be easily produced using a first light emitting module 11A and a plurality of second light emitting modules 12.

In a light emitting device 120, the second light emitting modules 12 may have various shapes as explained with reference to FIG. 8.

As shown in FIG. 23, in the light emitting device 120, the second edge ep2 of the first light emitting module 11 has a concave shape. As shown in FIG. 24, in the light emitting device 120, the sixth edge ep6 (or the second portion ep2) of the first light emitting module 11A is curved.

Figure 25:
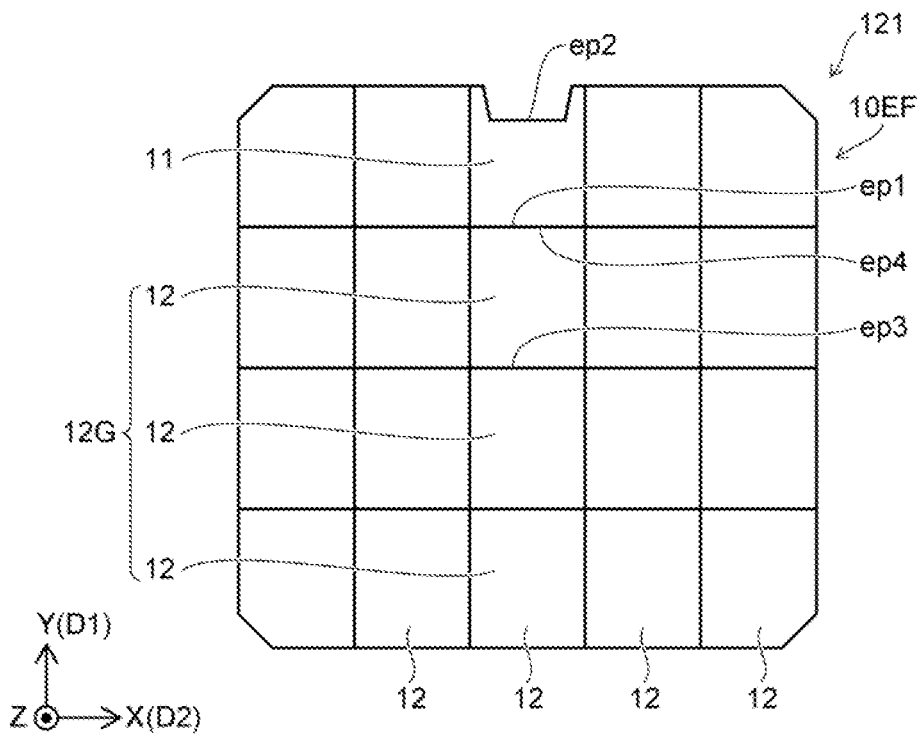
FIG. 25 is a schematic plan view illustrating by example a light emitting device according to the second embodiment.
Figure 26:
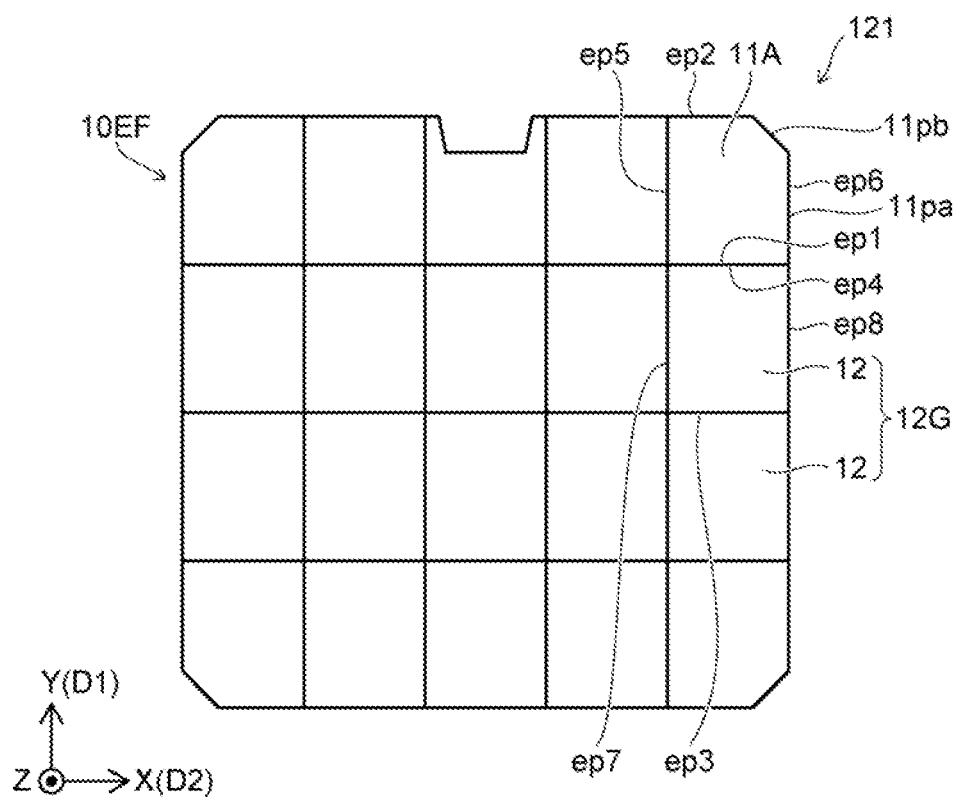
FIG. 26 is a schematic plan view illustrating by example a light emitting device according to the second embodiment.

FIG. 25 and FIG. 26 are schematic plan views each illustrating a light emitting device according to the second embodiment. As shown in FIG. 25, in the light emitting device 121, the second edge ep2 of the first light emitting module 11 is concave shaped. At least a portion of the concave shape is linear.

As shown in FIG. 26, in the light emitting device 121, the second portion 11pb of the first light emitting module 11A is a straight line which is oblique to the first direction D1.

Figure 27:
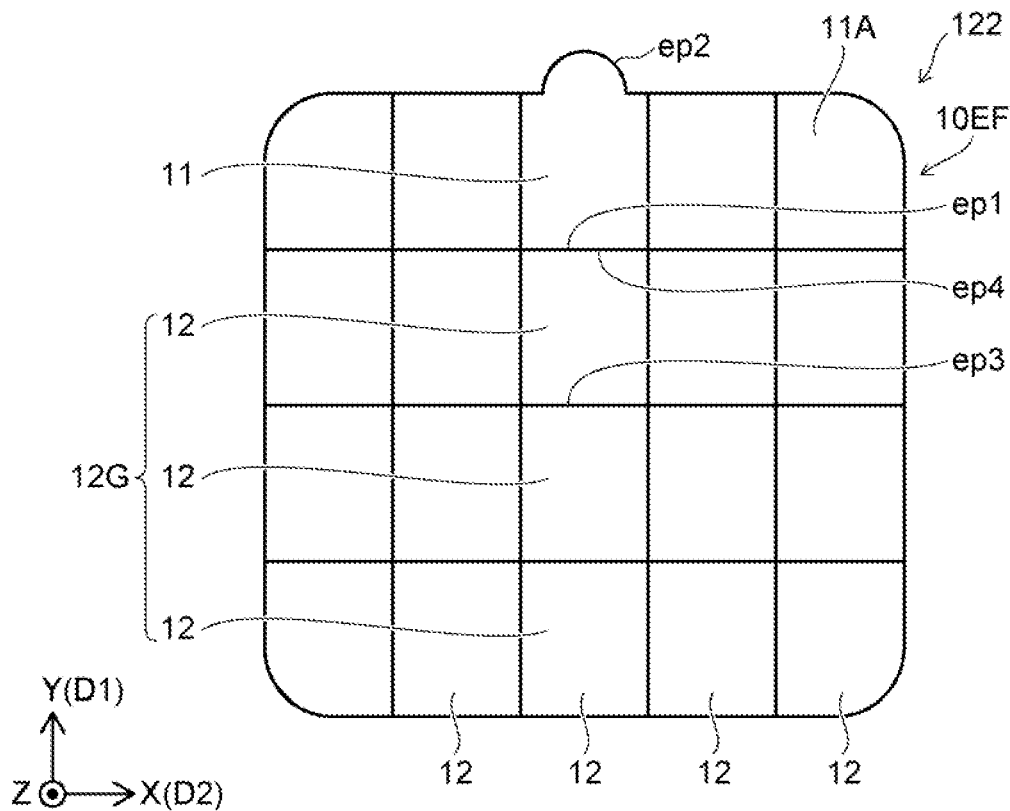
FIG. 27 is a schematic plan view illustrating by example a light emitting device according to the second embodiment.

FIG. 27 is a schematic plan view illustrating by example a light emitting device according to the second embodiment. As shown in FIG. 27, in the light emitting device 122, the second edge ep2 of the first light emitting module 11 is convex shaped. In this example, the convex shape is curved. In the light emitting device 122, a part of the outline of the first light emitting module 11A at a corner is convex shaped. Multiple convex shaped parts may be provided at the second edge ep2. Multiple convex parts may be provided at the outline of the first light emitting module 11A at the corners.

In the examples shown in FIG. 23 to FIG. 27, the length of a second light emitting module 12 along the first direction D1 is different from the length of the second light emitting module 12 along the second direction D2.

Figure 28:
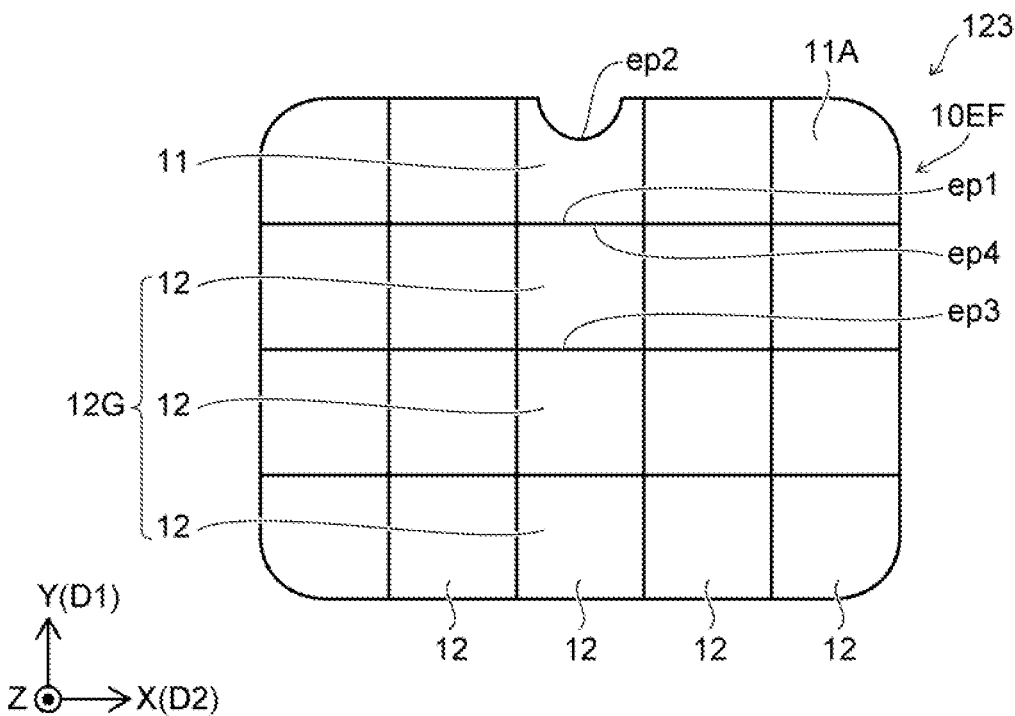
FIG. 28 is a schematic plan view illustrating by example a light emitting device according to the second embodiment.

FIG. 28 is a schematic plan view of a light emitting device according to the second embodiment. As shown in FIG. 28, in the light emitting device 123, the length of a second light emitting module 12 along the first direction D1 is substantially the same as the length of the second light emitting module 12 along the second direction D2.

In this embodiment, the shape of the first light emitting module 11 (or 11A) is different from the shape of a second light emitting module 12. The first light emitting module 11 (or 11A) is not quadrilateral, for example. In the case where a plurality of light emitting elements 11E are disposed in such a first light emitting module 11 (or 11A), the brightness of the light emitting elements 11E may be controlled in accordance with the shape of the first light emitting module 11 (or 11A). Example of such a control method will be explained below.

Figure 29:
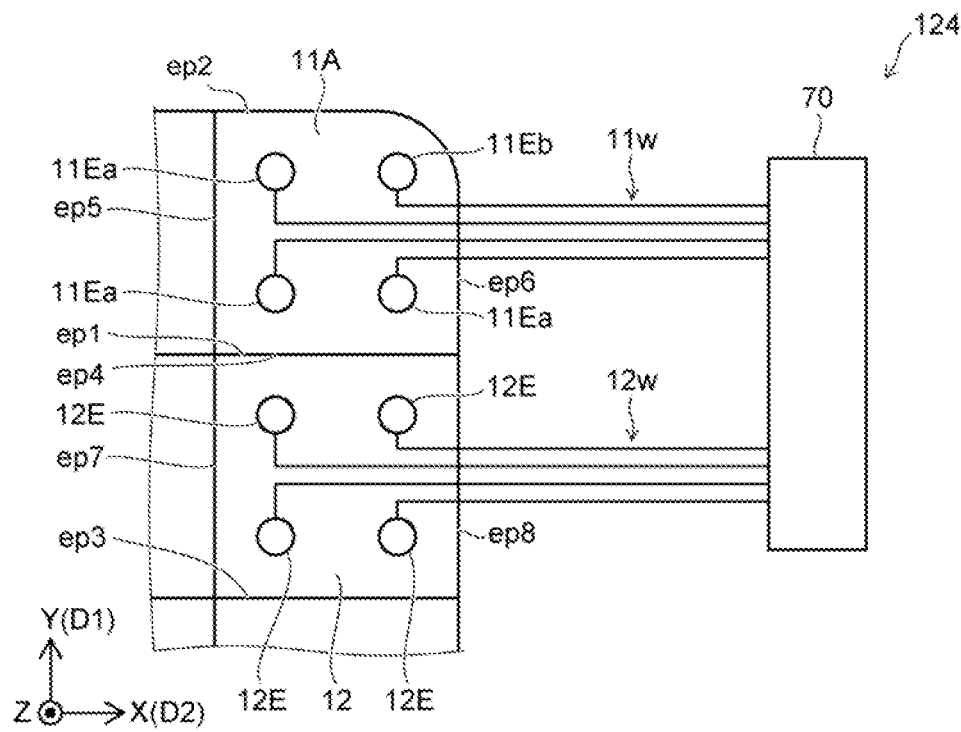
FIG. 29 is a schematic plan view illustrating by example a portion of a light emitting device according to the second embodiment.

FIG. 29 is a schematic plan view illustrating a portion of a light emitting device according to the second embodiment. As shown in FIG. 29, in the light emitting device 124, the first light emitting module 11A includes a plurality of first light emitting elements 11E (light emitting elements 11Ea and light emitting element 11Eb). Each first light emitting element 11E is electrically connected to the circuit part 70 using a wire 11w. The second light emitting module 12 includes a plurality of second light emitting elements 12E. Each second light emitting element 12E is electrically connected to the circuit part 70 using a wire 12w.

As already explained, the shape of the first light emitting module 11A is different from the shape of the second light emitting module 12. In this example, the first light emitting module 11A has a shape at the corner portion. In the first light emitting module 11A, a plurality of light emitting elements 11Ea and a single light emitting element 11Eb are disposed.

The direction from one of the light emitting elements 11Ea (the lower left element in FIG. 29) to another light emitting element 11Ea (the upper left element in FIG. 29) is along the first direction D1.

The direction from the light emitting element 11Ea (the lower left element in FIG. 29) to another light emitting element 11Ea (the lower right element in FIG. 29) is along the second direction D2.

The direction from the light emitting element 11Ea (the upper left element in FIG. 29) to the light emitting element 11Eb is along the second direction D2. The direction from the other light emitting element 11Ea (the lower right element in FIG. 29) to the light emitting element 11Eb is along the first direction D1.

The distance along the first direction D1 between the light emitting element 11Eb and the second edge ep2 is shorter than the distance along the first direction D1 between one of the light emitting elements 11Ea (the lower left element in FIG. 29) and the second edge ep2.

The distance along the second direction D2 between the light emitting element 11Eb and the sixth edge ep6 is shorter than the distance along the second direction D2 between one of the light emitting elements 11Ea (the lower left element in FIG. 29) and the sixth edge ep6.

The distance along the first direction D1 between the light emitting element 11Eb and the second edge ep2 is shorter than the distance along the first direction D1 between another light emitting element 11Ea (the lower right element in FIG. 29) and the second edge ep2.

The distance along the second direction D2 between the light emitting element 11Eb and the sixth edge ep6 is shorter than the distance along the second direction D2 between another light emitting element 11Ea (the upper left element in FIG. 29) and the sixth edge ep6.

For example, the light emitting element 11Eb among the light emitting elements included in the first light emitting module 11 is closest to the second edge ep2 and the sixth edge ep6. The light emitting element 11Eb is the light emitting element located closely to the corner of the module which has a different shape from that of the second light emitting module 12.

In this embodiment, the circuit part 70 may supply a different current to at least one of the first light emitting elements 11E (the light emitting element 11Eb) from the current supplied to the other first light emitting elements (the light emitting elements 11Ea).

For example, if the same current is supplied to all of the first light emitting elements 11E, light of substantially the same intensity is output from all of the first light emitting elements 11E. In this case, the brightness in the vicinity of the light emitting element 11Eb near the corner might be different from the brightness in the vicinity of the other light emitting elements 11Ea. Thus, the brightness in the vicinity of the corner might be brighter than the remaining part. This might make it difficult to achieve uniform brightness when the same current is supplied to all of the first light emitting elements 11E.

In this embodiment, the circuit part 70 supplies current to a portion of the first light emitting elements 11E (the light emitting element 11Eb) included in the first light emitting module 11 that is different from the current supplied to the others (the light emitting elements 11Ea) of the first light emitting elements 11E. For example, the circuit part 70 makes the former smaller than the latter. In this manner, the uniformity of in-plane brightness of the emission face 10EF can be improved.

In this embodiment, the method of varying the current supplied to a portion of the first light emitting elements 11E may include at least varying of the amount of electric current or the duty ratio of the current. Varying of the duty ratio includes, for example, varying of the pulse width ratio relative to time required to complete one cycle in pulse width modulation (PWM).

The current may be varied based on the results of detecting brightness. The current may be varied based on the results of detecting the current flowing through the light emitting elements.

Third Embodiment

When a plurality of light emitting elements are disposed in a light emitting module in a third embodiment of the present disclosure, the circuit part 70 can change the electrical connection to the plurality of light emitting elements.

Figure 30:
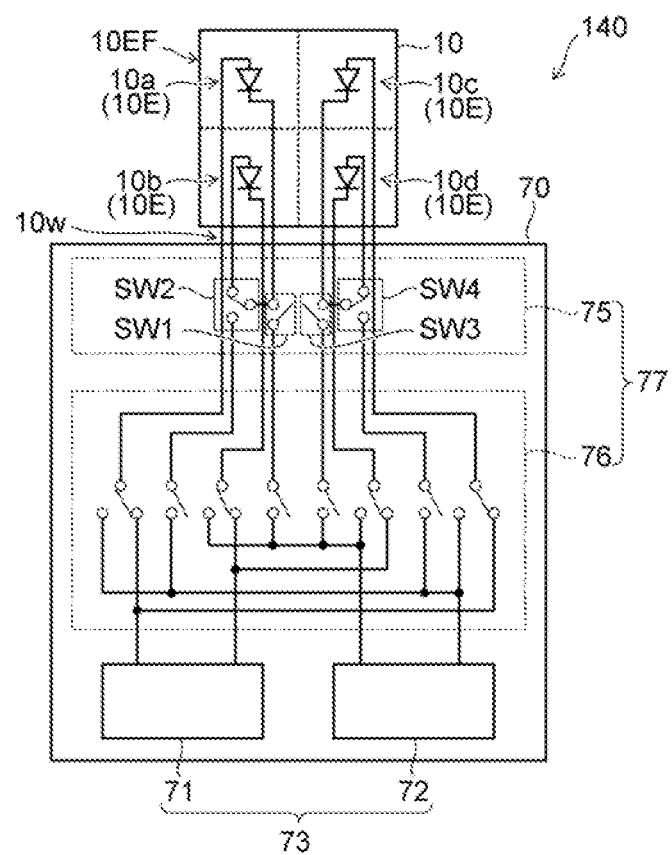
FIG. 30 is a schematic diagram illustrating by example a light emitting device according to a third embodiment of the present disclosure.

FIG. 30 is a schematic diagram illustrating by example a light emitting device according to the third embodiment. FIG. 30 illustrates a portion of the emission face 10EF of the light emitting device 140. As shown in FIG. 30, the light emitting module 10 (for example, this can be a light emitting module 11) includes a plurality of light emitting elements (for example, light emitting elements 10a to 10d). The circuit part 70 is electrically connected to at least two of the light emitting elements 10E (for example, light emitting elements 10a to 10d). In this example, the circuit part 70 is electrically connected to the light emitting elements 10E (for example, light emitting elements 10a to 10d) using wires 10w.

In this embodiment, the circuit part 70 can switch among multiple different states relative to the light emitting elements 10E. The multiple states include a first state and a second state. For example, in the first state, two or more of the light emitting elements 10E are electrically connected in parallel. In the second state, the two or more of the light emitting elements 10E are electrically connected in series.

For example, the circuit part 70 includes a wiring conversion part 75 and a power switch part 76. The wiring conversion part 75 and the power switch part 76 are included in a switch part 77. A first power supply 71 and a second power supply 72 are provided. The first power supply 71 and the second power supply 72 are included in the power supply part 73. The first power supply 71 and the second power supply 72 may be included in the circuit part 70. The first power supply 71 and the second power supply 72 may be provided separately from the circuit part 70.

In this example, the wiring conversion part 75 is disposed in the current path between the light emitting elements 10E and the first power supply 71 and in the current path between the light emitting elements 10E and the second power supply 72. The power supply switch part 76 is disposed in the current path between the wiring conversion part 75 and the first power supply 71 and in the current path between the wiring conversion part 75 and the second power supply 72.

The power supply switch part 76 can switch between the state where the wiring conversion part 75 is connected to the first power supply 71 and the state where the wiring conversion part 75 is connected to the second power supply 72.

The wiring conversion part 75 includes, for example, first to fourth switches SW1 to SW4.

The first switch SW1 switches between the state where a terminal of the light emitting element 10a is electrically connected to the power supply switch part 76 and the state where it is not connected.

The second switch SW2 switches between the state where a terminal of the light emitting element 10b is electrically connected to the power supply switch part 76 and the state where it is electrically connected to the terminal of the light emitting element 10a described above.

The first switch SW1 and the second switch SW2 can achieve the state where the light emitting element 10a and the light emitting element 10b are electrically connected in series and the state where the light emitting element 10a and the light emitting element 10b are electrically separated.

The third switch SW3 switches between the state where a terminal of the light emitting element 10c is electrically connected to the power supply switch part 76 and the state where it is not connected.

The fourth switch SW4 switches between the state where a terminal of the light emitting element 10d is electrically connected to the power supply switch part 76 and the state where it is electrically connected to the terminal of the light emitting element 10c described above.

The third switch SW3 and the fourth switch SW4 can achieve the state where the light emitting element 10c and the light emitting element 10d are electrically connected in series and the state where the light emitting element 10c and the light emitting element 10d are electrically separated.

In this manner, the multiple connection states can be achieved as explained below.

Figure 31:
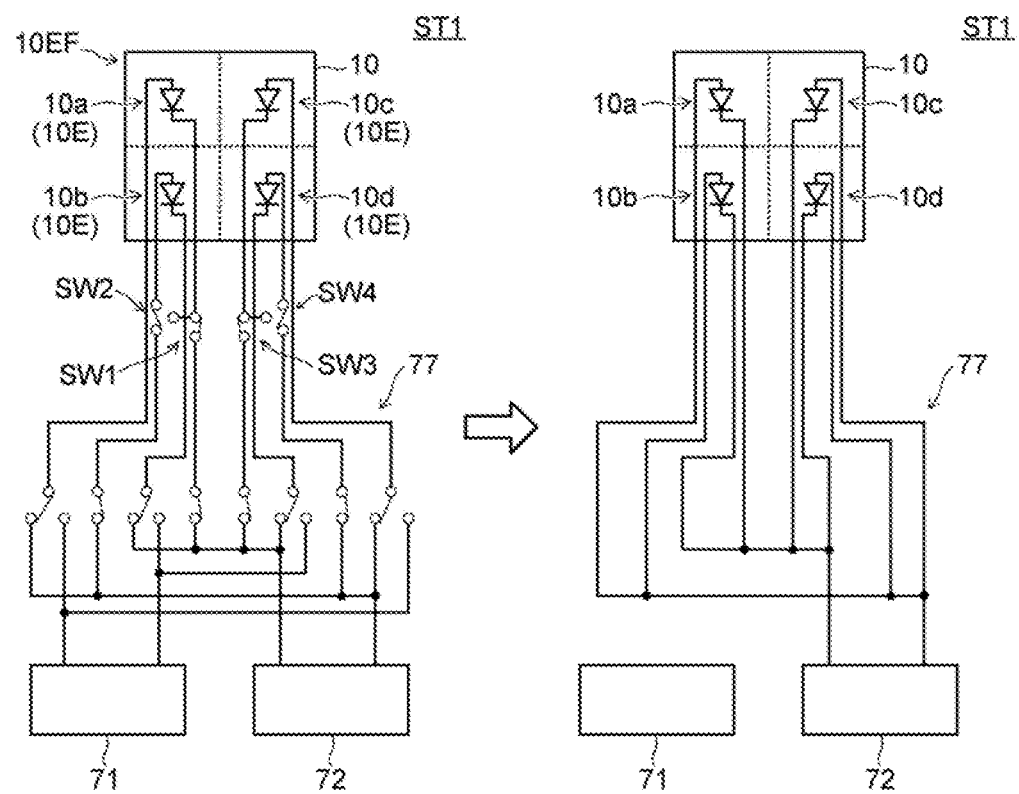
FIG. 31 is a schematic diagram illustrating by example a light emitting device according to the third embodiment.

FIG. 31 is a schematic diagram illustrating by example a light emitting device according to the third embodiment. As shown in FIG. 31, in one state of connection, the state in which the light emitting elements 10a to 10d are electrically connected in parallel to the second power supply 72 (first state ST1) is achieved.

Figure 32:
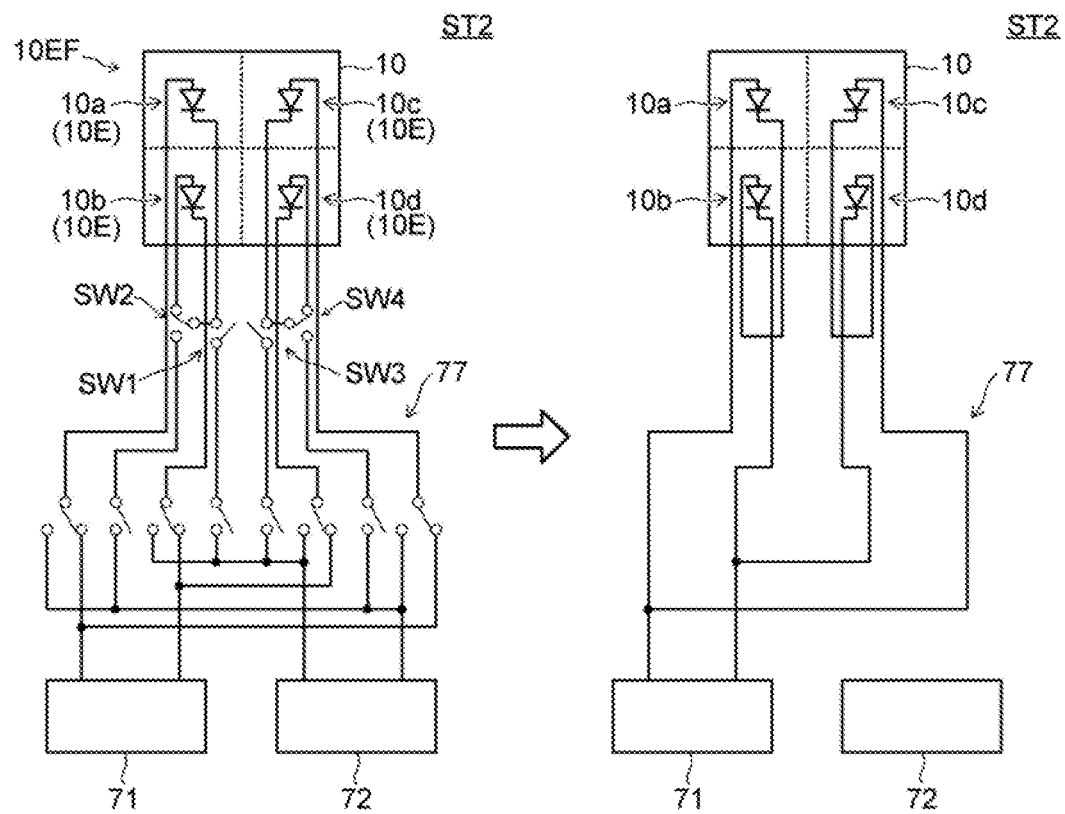
FIG. 32 is a schematic diagram illustrating by example a light emitting device according to the third embodiment.

FIG. 32 is a schematic diagram illustrating by example a light emitting device according to the third embodiment. As shown in FIG. 32, in another state of connection (second state ST2), the light emitting elements 10a and 10b are electrically connected in series, and the light emitting elements 10c and 10d are electrically connected in series. The serially connected light emitting elements 10a and 10b and the serially connected light emitting elements 10c and 10d are electrically connected in parallel. The serially connected light emitting elements 10a and 10b and the serially connected light emitting elements 10c and 10d are electrically connected in parallel to the first power supply 71.

As described above, in this embodiment, the circuit part 70 can create the first state ST1 (see FIG. 31) where two or more of the light emitting elements 10E are electrically connected in parallel. The circuit part 70 can create the second state ST2 (see FIG. 32) where the two or more of the light emitting elements 10E described above are electrically connected in series. The circuit part 70 can switch between the two states described above.

For example, light emitting modules of the same design can be used in multiple states of connection by controlling the switch part 77. For example, a different product having a different state of connection can be easily provided controlling the switch part 77. For example, this can standardize the light emitting module design, thereby reducing the types of parts for use in the light emitting modules. This can reduce the number of materials of various types such as molds for use in manufacturing light emitting modules. This can achieve high production efficiency and reduce costs. According to the embodiment, multiple operating states can be easily achieved based on multiple states of connection. In accordance with the embodiment, a light emitting device having more functions can be provided.

Such a circuit part 70 can be applied to a light emitting device related to the first or second embodiment.

For example, in the first embodiment, a plurality of first light emitting elements 11E are disposed in the first light emitting module 11 (see FIG. 16). The circuit part 70 may switch between the first state ST1 and the second state ST2 described above in relation to at least two of the first light emitting elements 11E.

For example, in the first embodiment, a plurality of second light emitting elements 12E are disposed in a second light emitting module 12 (see FIG. 16). The circuit 70 may switch between the first state ST1 and the second state ST2 described above in relation to at least two of the second light emitting elements 12E.

For example, in the second embodiment, a plurality of light emitting elements (such as light emitting elements 11Ea and 11Eb) are disposed in the first light emitting module 11 or 11A (see FIG. 29). The circuit 70 may switch between the first state ST1 and the second state ST2 described above in relation to at least two of the light emitting elements (such as light emitting elements 11Ea and 11Eb).

For example, in the second embodiment, a plurality of second light emitting elements 12E are disposed in the second light emitting module 12 (see FIG. 29). The circuit part 70 may switch between the first state ST1 and the second state ST2 described above in relation to at least two of the second light emitting elements 12.

For example, the circuit part 70 includes a power supply 73 and a switch part 77. The switch part 77 switches between the states of connection described above.

For example, the light emitting elements include first to fourth light emitting elements. The first to fourth light emitting elements are assumed, for example, as light emitting elements 10a to 10d.

For example, the switch part 77 connects the first to fourth light emitting elements (light emitting elements 10a to 10d) to the power supply part 73 in parallel in the first state ST1.

The switch part 77, in the second state ST2, connects the first light emitting element (light emitting elements 10a) and the second light emitting element (light emitting element 10b) in series, while connecting the third light emitting element (light emitting element 10c) and the fourth light emitting element (light emitting element 10d) in series. The switch part 77 electrically connects the group including the first light emitting element (light emitting element 10a) and the second light emitting element (light emitting element 10b) and the group including the third light emitting element (light emitting element 10c) and the fourth light emitting element (light emitting element 10d) to the power supply part 73 in parallel.

Figure 33:
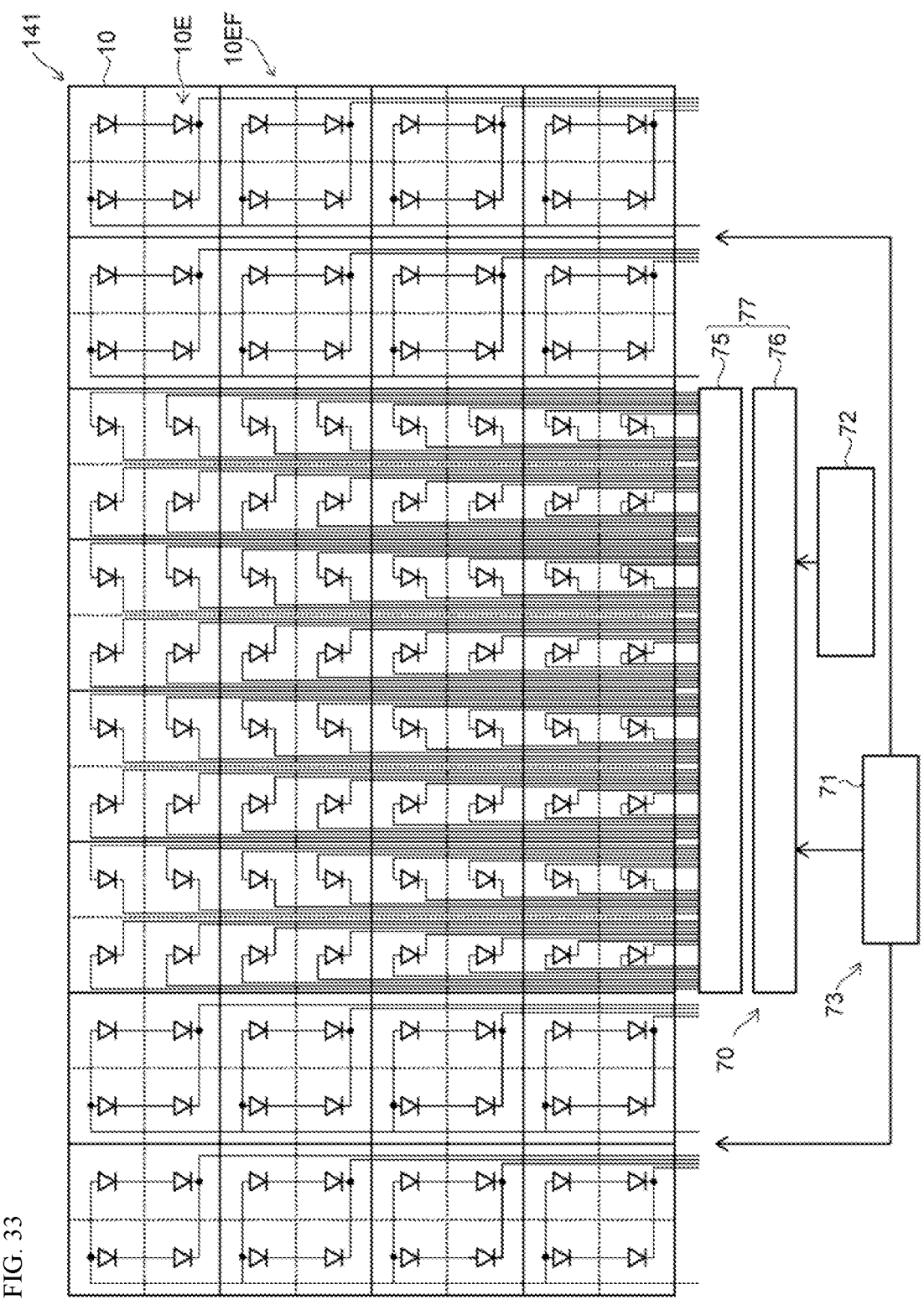
FIG. 33 is a schematic diagram illustrating by example a light emitting device according to the third embodiment.

FIG. 33 is a schematic diagram illustrating by example a light emitting device according to the third embodiment. As shown in FIG. 33, in the light emitting device 141, a plurality of light emitting modules 10 and a circuit part 70 are provided. Each of the light emitting modules 10 includes a plurality of light emitting elements 10E. In the light emitting device 141, the switching between the first state ST1 and the second state ST2 described above is performed.

According to this embodiment, a light emitting device having more functions can be provided.

In the foregoing, certain embodiments of the present invention have been explained with reference to specific examples. The present invention, however, is not limited to these specific examples. For example, the light emitting modules, light emitting elements, circuit parts, and the like to be included in a light emitting device suitably selected from among those known by a person skilled in the art fall within the scope of the present invention so long as the present invention can be similarly implemented and similar effects achieved.

Moreover, anything that combines any two or more elements of the specific examples to the extent technically possible also falls within the scope of the present invention so long as it encompasses the subject matter of the present invention.

In addition, all light emitting devices implementable by a person skilled in the art by suitably making design changes based on the light emitting devices described above as the embodiments of the present invention also fall within the scope of the present invention so long as they encompass the subject matter of the present invention.

Furthermore, various modifications and alterations within the spirit of the present invention that could have been made by a person skilled in the art are also considered as those falling within the scope of the present invention.

What is claimed is:

1. A light emitting device comprising:
    a first light emitting module including a first side along a first direction and a second side along the first direction, a direction from the first side to the second side being along a second direction intersecting the first direction, and
    a plurality of second light emitting modules lined up along the second direction,
    wherein a direction from a first emission region which includes the plurality of second light emitting modules to the first light emitting module is along the first direction,
    the first emission region includes a third side along the first direction and a fourth side along the first direction, a direction from the third side to the first side is along the first direction, and a direction from the fourth side to the second side is along the first direction, wherein the first light emitting module includes a plurality of first light emitting elements, at least one of the plurality of second light emitting modules includes a plurality of second light emitting elements, and a pitch for the plurality of first light emitting elements along the first direction is substantially the same as a pitch for the plurality of second light emitting elements along the first direction.

2. The light emitting device according to claim 1, wherein a distance from the first side to the second side along the second direction is substantially the same as a sum of the lengths of the plurality of second light emitting modules along the second direction.

3. The light emitting device according to claim 1, wherein the first emission region includes a plurality of groups lined up along the first direction, and at least one of the plurality of groups includes the plurality of second light emitting modules.

4. The light emitting device according to any of claim 1, further comprising a second emission region, wherein the second emission region includes a plurality of second light emitting modules lined up along the first direction, a direction from the first light emitting module to the second emission region is along the second direction, the first light emitting module includes a fifth side along the second direction and a sixth side along the second direction, a direction from the fifth side to the sixth side being along the first direction, and the second emission region includes a seventh side along the second direction and an eighth side along the second direction, a direction from the fifth side to the seventh side being along the second direction while a direction from the sixth side to the eighth side being along the second direction.

5. The light emitting device according to claim 1, wherein the emission face of the light emitting device is substantially quadrilateral formed with one or more first light emitting modules and a plurality of second light emitting modules.

6. The light emitting device according to claim 1, further comprising a circuit part, wherein the first light emitting module includes a plurality of light emitting elements, the circuit part is electrically connected to two or more of the plurality of light emitting elements, and the circuit part switches between a first state where the two or more of the plurality of light emitting elements are electrically connected in parallel and a second state where the two or more of the plurality of light emitting elements are electrically connected in series.

7. A light emitting device comprising:
a first light emitting module, and
a group of a plurality of second light emitting modules lined up along a first direction, wherein the first light emitting module is disposed at one end of the group, a direction from the group to the first light emitting module is along the first direction, and a shape of the first light emitting module is different from a shape of each of the plurality of second light emitting modules, wherein the first light emitting module includes a plurality of first light emitting elements, at least one of the plurality of second light emitting modules includes a plurality of second light emitting elements, and a pitch for the plurality of first light emitting elements along the first direction is substantially the same as a pitch for the plurality of second light emitting elements along the first direction.

8. The light emitting device according to claim 7, wherein the first light emitting module includes a first edge and a second edge, the first edge is located between the second edge and the group in the first direction, at least one of the plurality of second light emitting modules includes a third edge and a fourth edge, the fourth edge is located between the third edge and the first light emitting module in the first direction, the fourth edge is along the first edge, and a shape of the second edge is different from a shape of the fourth edge.

9. The light emitting device according to claim 8, wherein the first edge and the fourth edge are along the direction that intersects with the first direction.

10. The light emitting device according to claim 9, wherein the first light emitting module includes a fifth edge and a sixth edge, a direction from the fifth edge to the sixth edge is along the second direction that intersects with the first direction, said at least one of the plurality of second light emitting modules includes a seventh edge and an eighth edge, a direction from the seventh edge to the fifth edge is along the first direction, a direction from the eighth edge to at least a portion of the sixth edge is along the first direction, the sixth edge includes a first part and a second part, the first part being located in the first direction between the second part in the first direction and the position of the eighth edge in the first direction, and a distance between at least a portion of the second part and the fifth edge along the second direction is shorter than a distance between the first part and the fifth edge along the second direction.

11. The light emitting device according to claim 10, wherein the fifth edge, the seventh edge, and the eighth edge are along the first direction, and at least a portion of the second part is oblique to the first direction.

12. The light emitting device according to claim 8, wherein at least a portion of the second edge is concave from the second edge towards the first edge.

* * * * *